(12) United States Patent
Shey et al.

(10) Patent No.: US 11,927,372 B2
(45) Date of Patent: Mar. 12, 2024

(54) VAPOR INJECTION HEAT PUMP

(71) Applicant: Ford Global Technologies, LLC, Dearborn, MI (US)

(72) Inventors: Rachael Shey, Clawson, MI (US); Jeffrey Paul Brown, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 17/731,600

(22) Filed: Apr. 28, 2022

(65) Prior Publication Data
US 2023/0349597 A1  Nov. 2, 2023

(51) Int. Cl.
| | |
|---|---|
| *F25B 13/00* | (2006.01) |
| *B60H 1/00* | (2006.01) |
| *F25B 25/00* | (2006.01) |
| *F25B 30/02* | (2006.01) |
| *F25B 41/24* | (2021.01) |
| *F25B 43/00* | (2006.01) |

(52) U.S. Cl.
CPC ......... *F25B 13/00* (2013.01); *B60H 1/00921* (2013.01); *F25B 25/005* (2013.01); *F25B 30/02* (2013.01); *F25B 41/24* (2021.01); *F25B 43/006* (2013.01); *B60H 2001/00928* (2013.01); *F25B 2400/0411* (2013.01); *F25B 2600/2513* (2013.01)

(58) Field of Classification Search
CPC ........ F25B 13/00; F25B 25/005; F25B 30/02; F25B 41/24; F25B 43/006; F25B 2400/0411; F25B 2600/2513; B60H 1/00921; B60H 2001/00928
See application file for complete search history.

(56) References Cited

U.S. PATENT DOCUMENTS

| | | | |
|---|---|---|---|
| 10,457,111 B2 | 10/2019 | Gebbie et al. | |
| 11,267,318 B2* | 3/2022 | He | B60H 1/00907 |
| 11,318,816 B2* | 5/2022 | Kim | B60H 1/32281 |
| 2019/0128573 A1* | 5/2019 | He | F25B 5/04 |
| 2020/0039323 A1* | 2/2020 | He | B60H 1/00914 |

FOREIGN PATENT DOCUMENTS

| | | | | |
|---|---|---|---|---|
| CN | 105874288 A | * | 8/2016 | ......... B60H 1/00921 |
| JP | 4186245 B2 | * | 11/2008 | |

* cited by examiner

*Primary Examiner* — Kun Kai Ma
(74) *Attorney, Agent, or Firm* — Vichit Chea; Price Heneveld LLP

(57) ABSTRACT

A heat pump includes a refrigerant loop. The refrigerant loop includes a compressor, a first region of a first heat exchanger. The first heat exchanger is positioned immediately downstream of an outlet of the compressor. A second heat exchanger is positioned downstream of the first heat exchanger. A vapor generator is positioned downstream of the first heat exchanger. The vapor generator is positioned upstream of the second heat exchanger in a first mode of operation. The vapor generator is positioned downstream of the second heat exchanger in a second mode of operation. A first branching point is positioned immediately downstream of the first region of the first heat exchanger.

17 Claims, 16 Drawing Sheets

VAPOR INJECTION HEAT PUMP

FIELD OF THE DISCLOSURE

The present disclosure generally relates to heat pumps. More specifically, the present disclosure generally relates to vapor injection heat pumps.

BACKGROUND OF THE INVENTION

Heat pumps have been employed in vehicles. A refrigerant loop can be included in such heat pumps.

SUMMARY OF THE INVENTION

According to a first aspect of the present invention, a heat pump includes a refrigerant loop. The refrigerant loop includes a compressor, a first heat exchanger, a second heat exchanger, a vapor generator, and a first branching point. The compressor includes a low-pressure inlet, a mid-pressure inlet, and an outlet. A first region of the first heat exchanger is positioned immediately downstream of the outlet of the compressor. The second heat exchanger is positioned downstream of the first heat exchanger. The vapor generator is positioned downstream of the first heat exchanger. The vapor generator is positioned upstream of the second heat exchanger in a first mode of operation. The vapor generator is positioned downstream of the second heat exchanger in a second mode of operation. The vapor generator is positioned upstream of both the low-pressure inlet and the mid-pressure inlet. The vapor generator delivers at least a portion of a gaseous component of a first heat exchange fluid to the mid-pressure inlet of the compressor. The first branching point is positioned immediately downstream of the first region of the first heat exchanger.

Embodiments of the first aspect of the invention can include any one or a combination of the following features:
  the refrigerant loop includes a first shutoff valve positioned immediately downstream of the first branching point and a second shutoff valve positioned immediately downstream of the first branching point;
  the refrigerant loop includes a second heat exchanger positioned downstream of the second shutoff valve;
  the refrigerant loop includes a second branching point positioned downstream of the second heat exchanger;
  the refrigerant loop includes a third shutoff valve positioned downstream of the second branching point and a fourth shutoff valve positioned downstream of the second branching point;
  the refrigerant loop includes a first coupling point positioned downstream of the fourth shutoff valve;
  the refrigerant loop includes a third branching point positioned immediately downstream of the first coupling point;
  the refrigerant loop includes a first expansion valve positioned downstream of the third branching point;
  the vapor generator includes a first region and a second region, wherein the first region of the vapor generator is positioned immediately downstream of the first expansion valve, and wherein the second region of the vapor generator is positioned immediately downstream of the third branching point;
  the mid-pressure inlet of the compressor is immediately downstream of the first region of the vapor generator;
  the refrigerant loop includes a fourth branching point positioned downstream of the second region of the vapor generator;
  the refrigerant loop includes a fifth shutoff valve positioned immediately downstream of the fourth branching point the refrigerant loop includes a second expansion valve positioned immediately downstream of the fourth branching point;
  the refrigerant loop includes a second coupling point positioned immediately downstream of the second expansion valve, wherein the second coupling point is positioned immediately upstream of the second heat exchanger;
  the refrigerant loop includes a third expansion valve positioned downstream of the fifth shutoff valve; a third heat exchanger positioned immediately downstream of the third expansion valve; a fourth expansion valve positioned downstream of the fifth shutoff valve; a fourth heat exchanger positioned immediately downstream of the fourth expansion valve; and an accumulator positioned immediately upstream of the low-pressure inlet of the compressor; and
  a coolant loop that includes a pump, a second region of the first heat exchanger, a reservoir, a fifth heat exchanger, a first heat-producing component, a second heat-producing component, and a coolant network of conduits that fluidly couples components of the coolant loop.

According to a second aspect of the present disclosure, a heat pump includes a refrigerant loop. The refrigerant loop includes a compressor, a first heat exchanger, a second heat exchanger, a vapor generator, a first branching point, a second branching point, a first shutoff valve, a second shutoff valve, a third shutoff valve, and a fourth shutoff valve. The compressor includes a low-pressure inlet, a mid-pressure inlet, and an outlet. A first region of the first heat exchanger is positioned immediately downstream of the outlet of the compressor. The second heat exchanger is positioned downstream of the first heat exchanger. The vapor generator is positioned downstream of the first heat exchanger. The vapor generator is positioned upstream of the second heat exchanger in a first mode of operation. The vapor generator is positioned downstream of the second heat exchanger in a second mode of operation. The vapor generator is positioned upstream of both the low-pressure inlet and the mid-pressure inlet. The vapor generator delivers at least a portion of a gaseous component of a first heat exchange fluid to the mid-pressure inlet of the compressor. The first branching point is positioned immediately downstream of the first region of the first heat exchanger. The first shutoff valve is positioned immediately downstream of the first branching point. The second shutoff valve is positioned immediately downstream of the first branching point. The second heat exchanger is positioned downstream of the second shutoff valve. The second branching point is positioned downstream of the second heat exchanger. The third shutoff valve is positioned downstream of the second branching point. The fourth shutoff valve is positioned downstream of the second branching point.

Embodiments of the second aspect of the present disclosure can include any one or a combination of the following features:
  the refrigerant loop includes a first coupling point positioned downstream of the fourth shutoff valve; a third branching point positioned immediately downstream of the first coupling point; and a first expansion valve positioned downstream of the third branching point, wherein the vapor generator includes a first region and a second region, wherein the first region of the vapor generator is positioned immediately downstream of the first expansion valve, wherein the second region of the vapor generator is positioned immediately downstream of the third branching point, and wherein the mid-pressure inlet of the compressor is immediately downstream of the first region of the vapor generator;

the refrigerant loop includes a fourth branching point positioned downstream of the second region of the vapor generator; a fifth shutoff valve positioned immediately downstream of the fourth branching point; a second expansion valve positioned immediately downstream of the fourth branching point; and a second coupling point positioned immediately downstream of the second expansion valve, wherein the second coupling point is positioned immediately upstream of the second heat exchanger; and the refrigerant loop includes a third expansion valve positioned downstream of the fifth shutoff valve; a third heat exchanger positioned immediately downstream of the third expansion valve; a fourth expansion valve positioned downstream of the fifth shutoff valve; a fourth heat exchanger positioned immediately downstream of the fifth shutoff valve; and an accumulator positioned immediately upstream of the low-pressure inlet of the compressor.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
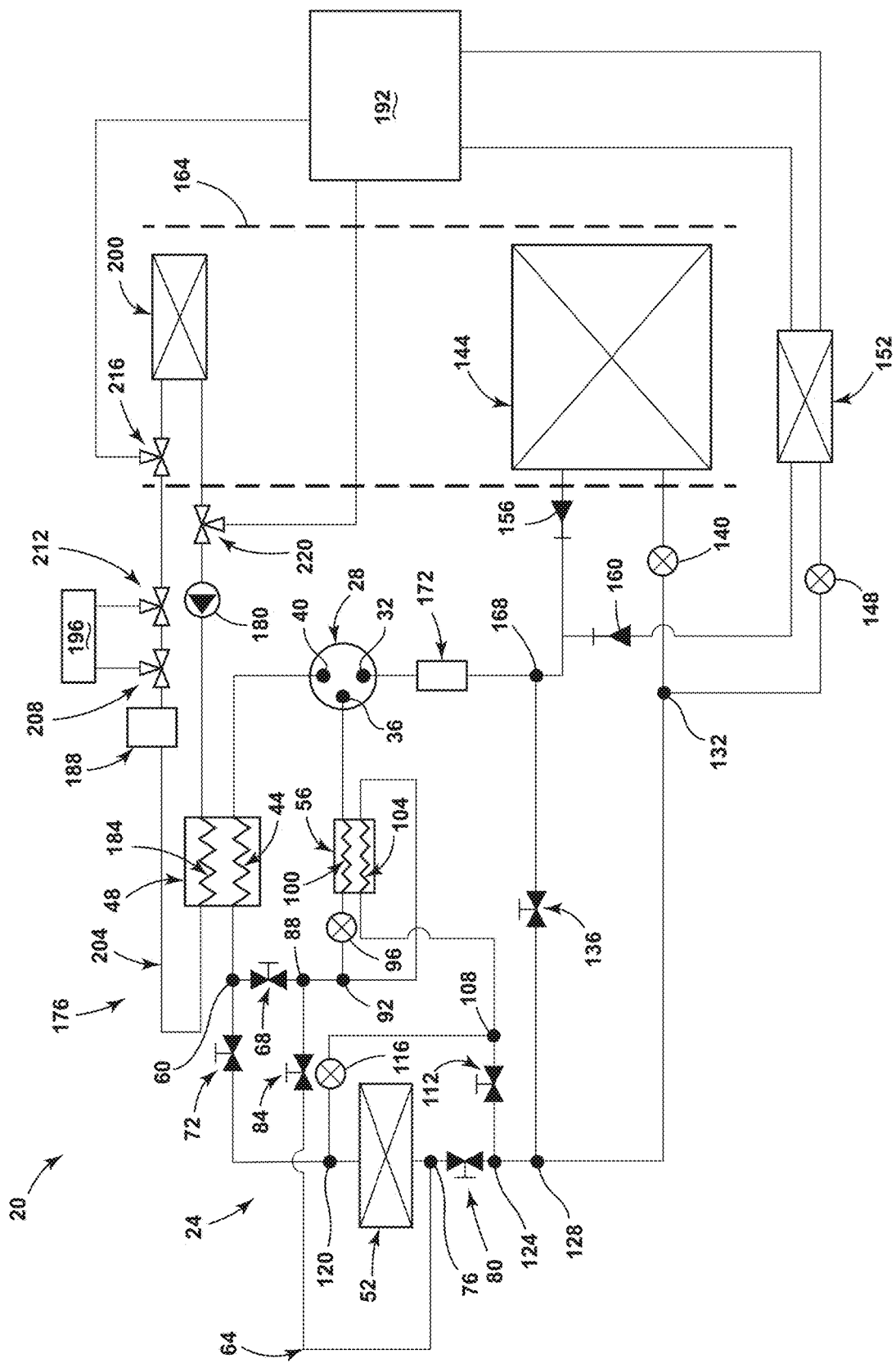
FIG. 1 is a schematic representation of a heat pump arrangement, illustrating a refrigerant loop and a coolant loop, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat pump. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-16, reference numeral 20 generally designates a heat pump. The heat pump 20 includes a refrigerant loop 24. In various examples, the heat pump 20 may be employed in a vehicle. In some examples, the vehicle may be a motor vehicle. The refrigerant loop 24 includes a compressor 28. The compressor 28 includes a low-pressure inlet 32, a mid-pressure inlet 36, and an outlet 40. A first region 44 of a first heat exchanger is positioned immediately downstream of the outlet 40 of the compressor 28. A second heat exchanger 52 is positioned downstream of the first heat exchanger 48. A vapor generator 56 is positioned downstream of the first heat exchanger 48. The vapor generator 56 may be positioned upstream of the second heat exchanger 52 in some modes of operation (e.g., see FIGS. 5-9 and 12-16). The vapor generator 56 may be positioned downstream of the second heat exchanger 52 in alternative modes of operation (e.g., see FIGS. 2-4 and 10-11). The vapor generator 56 is positioned upstream of the low-pressure inlet 32. The vapor generator 56 is also positioned upstream of the mid-pressure inlet 36. The vapor generator 56 delivers at least a portion of a gaseous component of a first heat exchange fluid to the mid-pressure inlet 36 of the compressor 28. The first heat exchange fluid is circulated through the refrigerant loop 24. A first branching point 60 is positioned immediately downstream of the first region 44 of the first heat exchanger 48. The various components of the refrigerant loop 24 are fluidly coupled to one another by a refrigerant network of conduits 64.

Referring again to FIGS. 1-16, a first shutoff valve 68 is positioned immediately downstream of the first branching point 60. A second shutoff valve 72 can also be positioned immediately downstream of the first branching point 60. At the first branching point 60, the refrigerant loop 24 splits into two paths. Therefore, the first and second shutoff valves 68, 72 can each be immediately downstream of the first branching point 60. For example, the first shutoff valve 68 can be positioned immediately downstream of the first branching point 60 on a first path, while the second shutoff valve 72 can be positioned immediately downstream of the first branching point 60 on a second path. The second heat exchanger 52 is positioned downstream of the second shutoff valve 72. A second branching point 76 is positioned downstream of the second heat exchanger 52. A third shutoff valve 80 is positioned downstream of the second branching point 76. A fourth shutoff valve 84 is also positioned downstream of the second branching point 76. For example, the third and fourth shutoff valves 80, 84 may each be positioned immediately downstream of the second branching point 76. As with the first branching point 60, at the second branching point 76, the refrigerant loop 24 splits into two paths. The third shutoff valve 80 can be positioned immediately downstream of the second branching point 76 on a first path, while the fourth shutoff valve 84 can be positioned immediately downstream of the second branching point 76 on a second path.

Referring further to FIGS. 1-16, a first coupling point 88 is positioned downstream of the fourth shutoff valve 84. A third branching point 92 is positioned immediately downstream of the first coupling point 88. A first expansion valve 96 is positioned downstream of the third branching point 92. The vapor generator 56 is also positioned downstream of the third branching point 92. The vapor generator 56 includes a first region 100 and a second region 104. The first region 100 of the vapor generator 56 is positioned immediately downstream of the first expansion valve 96. The second region 104 of the vapor generator 56 is positioned immediately downstream of the third branching point 92. As with the first branching point 60 and the second branching point 76, at the third branching point 92, the refrigerant loop 24 splits into two paths. For example, the refrigerant loop 24 can split into a first path and a second path at the third branching point 92. The first expansion valve 96 and at least a portion of the vapor generator 56 (e.g., the second region 104) can each be immediately downstream of the third branching point 92. The mid-pressure inlet 36 of the compressor 28 is immediately downstream of the first region 100 of the vapor generator 56.

Referring still further to FIGS. 1-16, a fourth branching point 108 is positioned downstream of the second region 104 of the vapor generator 56. A fifth shutoff valve 112 is positioned immediately downstream of the fourth branching point 108. A second expansion valve 116 is positioned immediately downstream of the fourth branching point 108. As with the preceding branching points, at the fourth branching point 108, the refrigerant loop 24 splits into two paths. The fifth shutoff valve 112 can be positioned immediately downstream of the fourth branching point 108 on a first path, while the second expansion valve 116 can be positioned immediately downstream of the fourth branching point 108 on a second path. A second coupling point 120 is positioned immediately downstream of the second expansion valve 116. The second coupling point 120 is positioned immediately upstream of the second heat exchanger 52. A third coupling point 124 is positioned immediately downstream of the third shutoff valve 80. The third coupling point 124 is also immediately downstream of the fifth shutoff valve 112. A fifth branching point 128 is immediately downstream of the third coupling point 124. A sixth branching point 132 is positioned immediately downstream of the fifth branching point 128. A sixth shutoff valve 136 is also positioned immediately downstream of the fifth branching point 128. As with the preceding branching points, at the fifth branching point 128, the refrigerant loop 24 splits into two paths. The sixth branching point 132 can be positioned immediately downstream of the fifth branching point 128 on a first path, while the sixth shutoff valve 136 can be positioned immediately downstream of the fifth branching point 128 on a second path.

Referring again to FIGS. 1-16, a third expansion valve 140 is positioned downstream of the fifth shutoff valve 112. The third expansion valve 140 may be positioned immediately downstream of the sixth branching point 132. A third heat exchanger 144 is positioned immediately downstream of the third expansion valve 140. A fourth expansion valve 148 is positioned downstream of the fifth shutoff valve 112. The fourth expansion valve 148 may be positioned immediately downstream of the sixth branching point 132. A fourth heat exchanger 152 is positioned immediately downstream of the fourth expansion valve 148. As with the preceding branching points, at the sixth branching point 132, the refrigerant loop 24 splits into two paths. The third expansion valve 140 can be positioned immediately downstream of the sixth branching point 132 on a first path, while the fourth expansion valve 148 can be positioned immediately downstream of the sixth branching point 132 on a second path. A first check valve 156 is positioned downstream of the third heat exchanger 144. A second check valve 160 is positioned downstream of the fourth heat exchanger 152. The third heat exchanger 144 can be in fluid communication with ductwork 164 of a Heating, Ventilation, and Air Conditioning (HVAC) system. Accordingly, the third heat exchanger 144 may be employed to alter a temperature and/or a humidity of ambient air and provide temperature-controlled and/or humidity-controlled air to an environment (e.g., a cabin of a vehicle). A fourth coupling point 168 is positioned downstream of the first check valve 156, the second check valve 160, and the sixth shutoff valve 136. An accumulator 172 is positioned immediately upstream of the low-pressure inlet 32 of the compressor 28.

Referring yet again to FIGS. 1-16, the heat pump 20 includes a coolant loop 176. The coolant loop 176 includes a pump 180, a second region 184 of the first heat exchanger 48, a reservoir 188, a first heat-producing component 192, a second heat-producing component 196, and a fifth heat exchanger 200. The various components of the coolant loop 176 are fluidly coupled with one another by a coolant network of conduits 204. A second heat exchange fluid (e.g., a coolant) flows through the coolant network of conduits 204 and the components of the coolant loop 176. The fifth heat exchanger 200 can be in fluid communication with the ductwork 164 of the Heating, Ventilation, and Air Conditioning (HVAC) system. Accordingly, the fifth heat exchanger 200 may be employed to alter a temperature and/or a humidity of ambient air and provide temperature-controlled and/or humidity-controlled air to an environment (e.g., a cabin of a vehicle). The second region 184 of the first heat exchanger 48 is immediately downstream of the pump 180. The reservoir 188 is immediately downstream of the second region 184 of the first heat exchanger 48. The fifth heat exchanger 200 is downstream of the reservoir 188.

Referring still further to FIGS. 1-16, a first three-way valve 208, a second three-way valve 212, and a third three-way valve 216 are each positioned between the reservoir 188 and the fifth heat exchanger 200. The first three-way valve 208 is positioned immediately downstream of the reservoir 188. The first three-way valve 208 is immediately upstream of the second heat-producing component 196 and may control flow of the second heat exchange fluid to the second heat-producing component 196. The second three-way valve 212 is immediately downstream of the first three-way valve 208. The second three-way valve 212 is also immediately downstream of the second heat-producing component 196. The third three-way valve 216 is immediately downstream of the second three-way valve 212. The third three-way valve 216 is immediately upstream of the first heat-producing component 192. The third three-way valve 216 is immediately upstream of the fifth heat exchanger 200. A fourth three-way valve 220 is positioned immediately downstream of the first heat-producing component 192. The fourth three-way valve 220 is also positioned immediately downstream of the fifth heat exchanger 200. The first heat-producing component 192 and the fifth heat exchanger 200 are plumbed in parallel with one another. The fourth three-way valve 220 is immediately upstream of the pump 180. The first heat-producing component 192 is in direct fluid communication with the fourth heat exchanger 152. Accordingly, the fourth heat exchanger 152 may exchange heat between the first heat exchange fluid and the second heat exchange fluid.

Referring now to FIGS. 2-16, in each of these modes of operation, the compressor 28 acts upon a first heat exchange fluid (e.g., a refrigerant) that is circulated through the refrigerant loop 24. Accordingly, the action of the compressor 28 drives the first heat exchange fluid from the outlet 40 of the compressor 28 toward an inlet 224 of the first region 44 of the first heat exchanger 48. Within the first heat exchanger 48, the first heat exchange fluid thermally interacts with a second heat exchange fluid that is circulated through the coolant loop 176 by way of the second region 184 of the first heat exchanger 48, as will be discussed in further detail herein. The first heat exchange fluid exits the first region 44 of the first heat exchanger 48 by way of an outlet 228 thereof. From the outlet 228 of the first region 44 of the first heat exchanger 48, the first heat exchange fluid is directed toward the first branching point 60.

Figure 2:
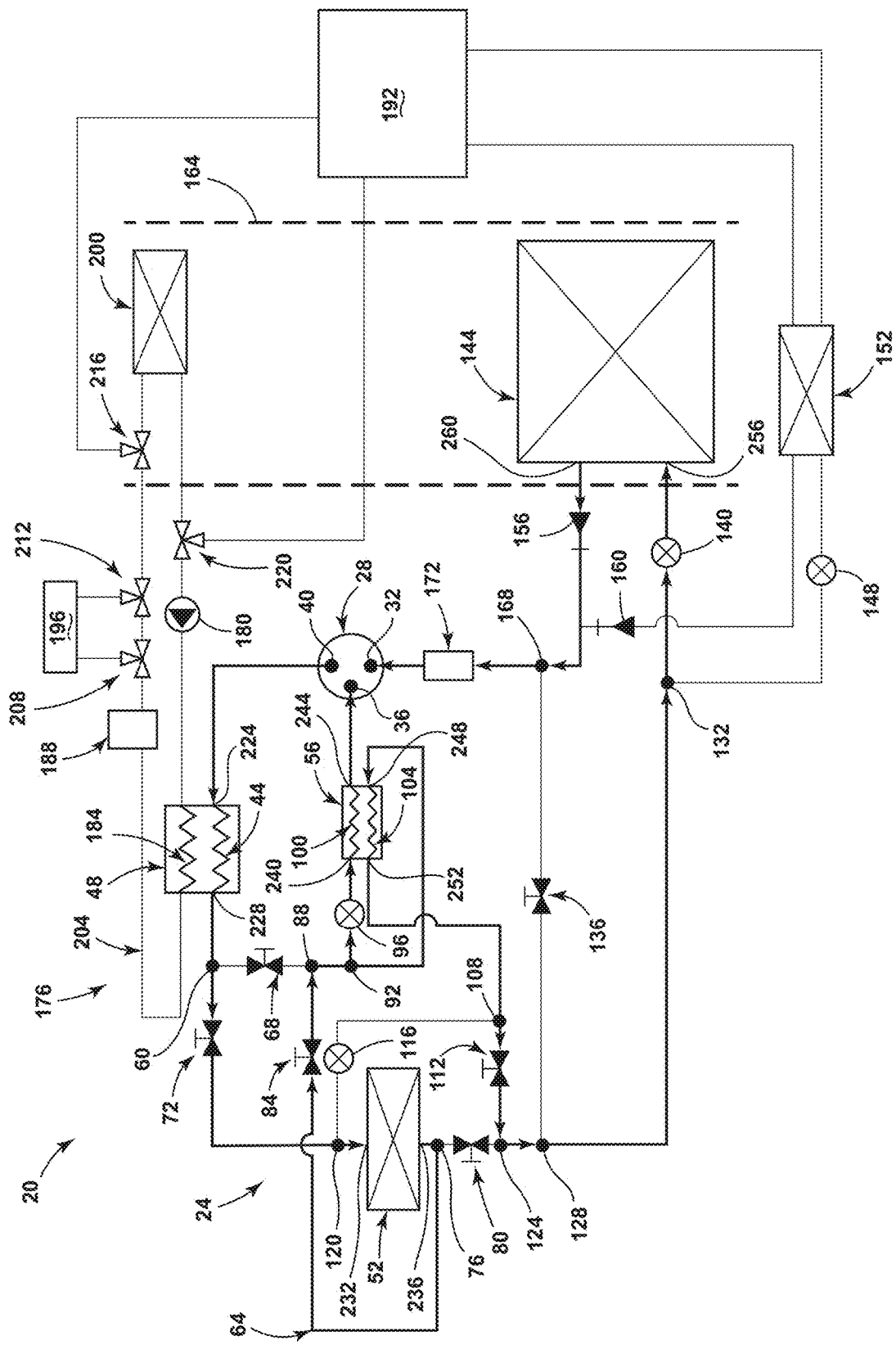
FIG. 2 is a schematic representation of the heat pump arrangement, illustrating a cabin cooling mode of operation, according to one example.
Figure 3:
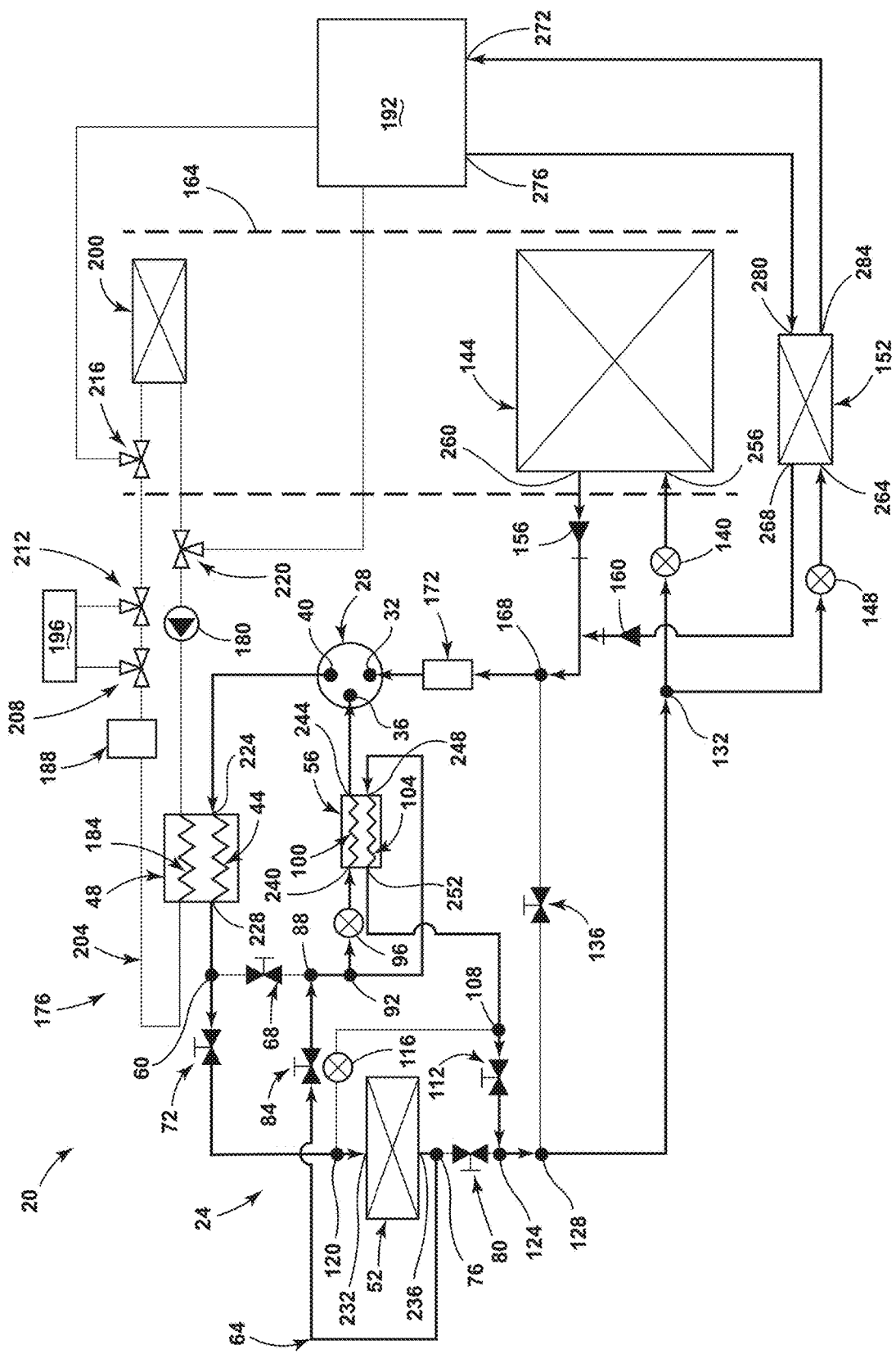
FIG. 3 is a schematic representation of the heat pump arrangement, illustrating a cabin and battery cooling mode of operation, according to one example.
Figure 4:
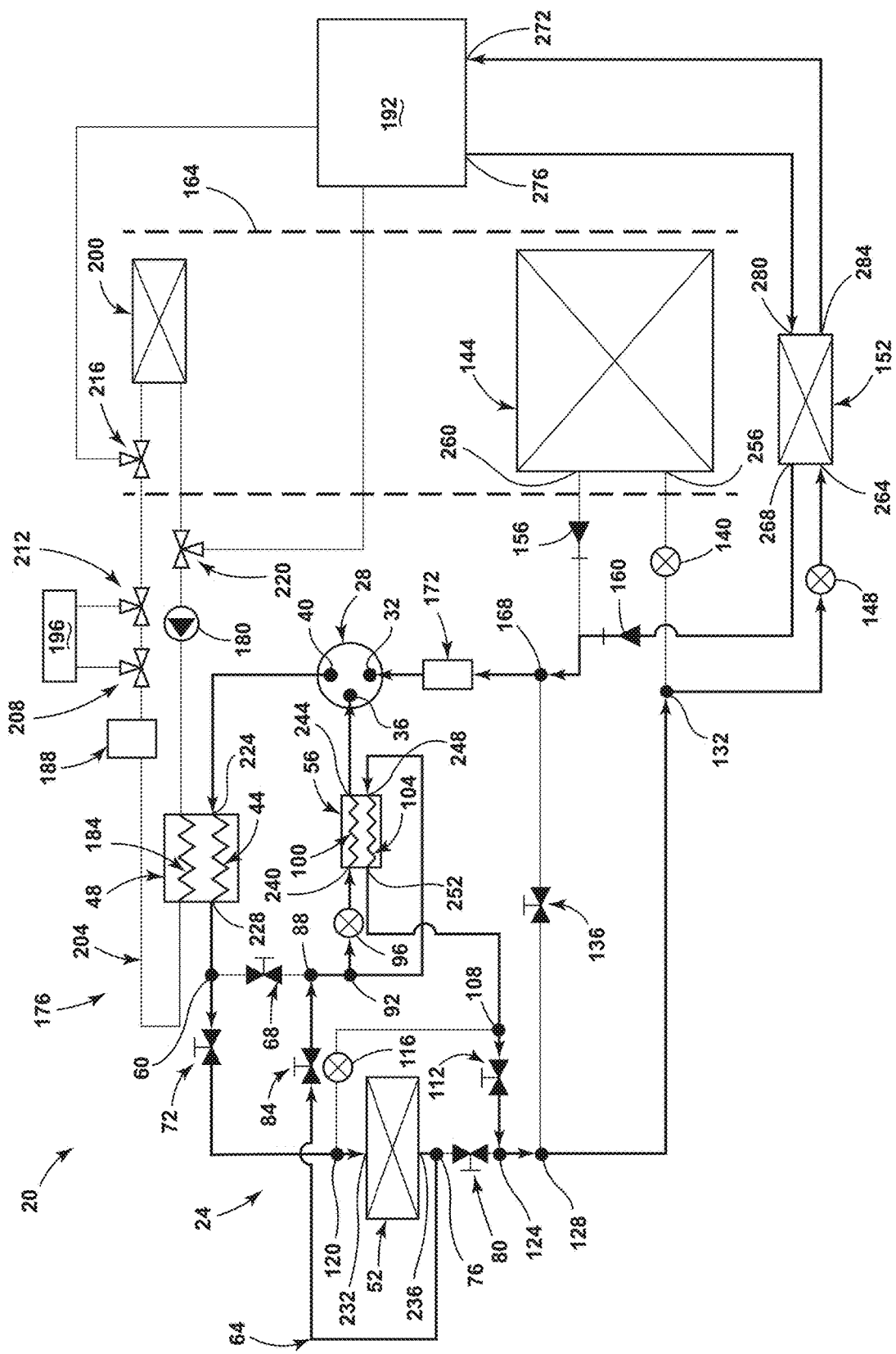
FIG. 4 is a schematic representation of the heat pump arrangement, illustrating a battery cooling mode of operation, according to one example.
Figure 5:
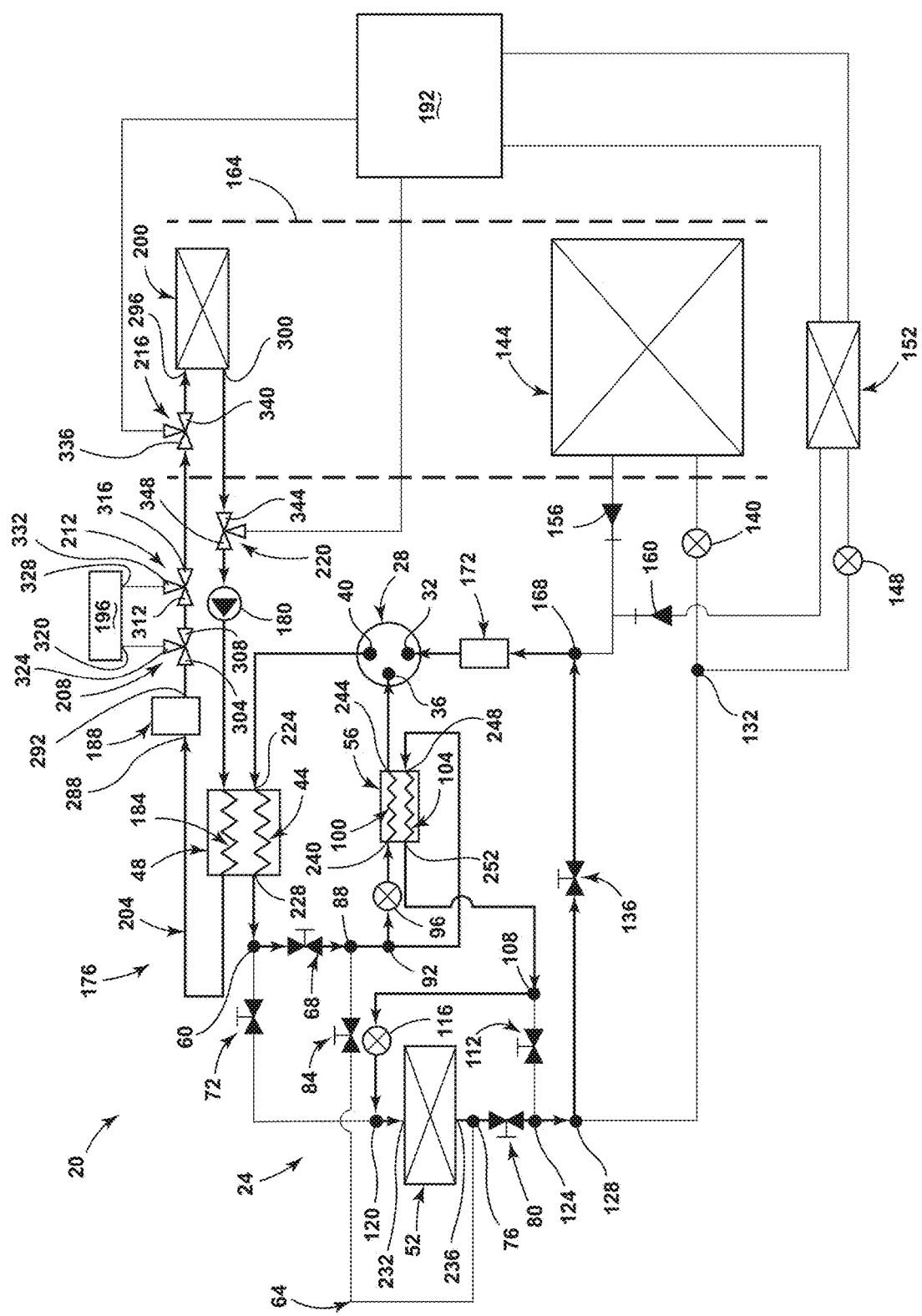
FIG. 5 is a schematic representation of the heat pump arrangement, illustrating a cabin heating and battery cooling mode of operation, according to one example.
Figure 6:
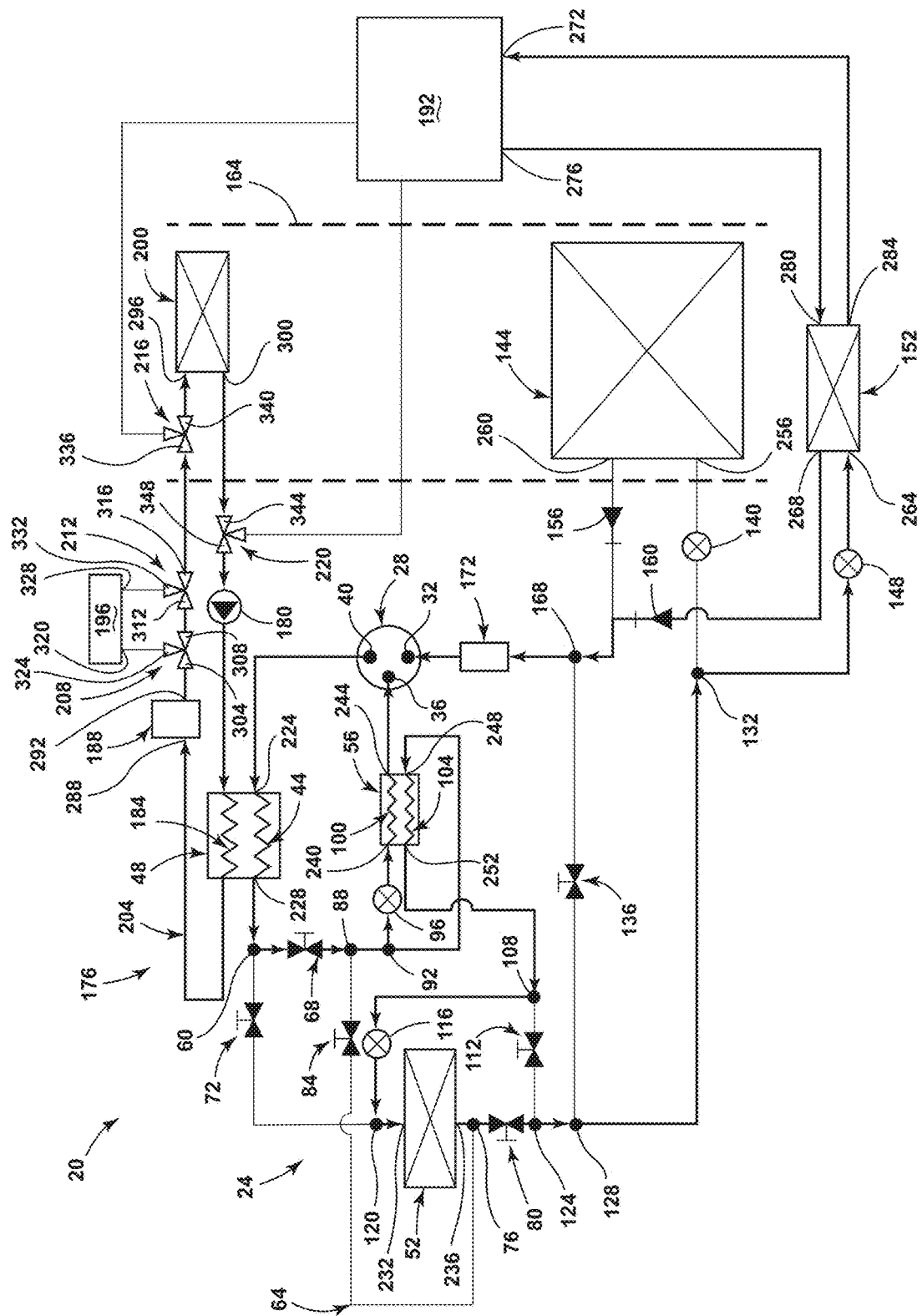
FIG. 6 is a schematic representation of the heat pump arrangement, illustrating a cabin heating and battery cooling mode of operation with serial evaporation, according to one example.

Referring to FIGS. 2-4, a cabin cooling mode of operation (FIG. 2), a cabin and battery cooling mode of operation (FIG. 3), and a battery cooling mode of operation (FIG. 4) are each depicted in exemplary form. In each of these modes of operation, the first shutoff valve 68 is in a closed position and the second shutoff valve 72 is in an open position. Accordingly, from the first branching point 60, the first heat exchange fluid is directed to the second shutoff valve 72. After flowing through the second shutoff valve 72, the first heat exchange fluid is directed toward an inlet 232 of the second heat exchanger 52. On the way to the inlet 232 of the second heat exchanger 52, the first heat exchange fluid passes through the second coupling point 120. As the first heat exchange fluid flows through the second heat exchanger 52, the first heat exchange fluid may thermally interact with a heat exchange fluid that is external to the refrigerant loop 24 and the coolant loop 176 (e.g., ambient air) such that heat may be removed from the first heat exchange fluid. In alternative modes of operation, at the second heat exchanger 52, the first heat exchange fluid may absorb heat from the heat exchange fluid that is external to the refrigerant loop 24 and the coolant loop 176. The flow of heat to or from the first heat exchange fluid at the second heat exchanger 52 depends upon the particular mode of operation and the thermal conditions of the heat exchange fluid that is external to the refrigerant loop 24 and the coolant loop 176. The first heat exchange fluid exits the second heat exchanger 52 at an outlet 236 of the second heat exchanger 52.

Referring again to FIGS. 2-4, the third shutoff valve 80 is in a closed position in each of these modes of operation. Accordingly, after exiting the second heat exchanger 52 by way of the outlet 236, the first heat exchange fluid encounters the second branching point 76 and is directed toward the fourth shutoff valve 84 by the refrigerant network of conduits 64. The fourth shutoff valve 84 is in an open position. Accordingly, the first heat exchange fluid passes through the fourth shutoff valve 84 and encounters the first coupling point 88. With the first shutoff valve 68 in the closed position, from the first coupling point 88, the first heat exchange fluid is directed toward the third branching point 92. At the third branching point 92, a portion of the first heat exchange fluid is diverted toward the first expansion valve 96, while the remaining portion of the first heat exchange fluid continues toward the second region 104 of the vapor generator 56. In various examples, the portion of the first heat exchange fluid that is diverted toward the first expansion valve 96 can be expressed as a ratio or percentage. For example, expressing the ratio as a percentage of the first heat exchange fluid that is diverted toward the first expansion valve 96, the first expansion valve 96 can receive about 5%, about 10%, about 15%, about 20%, about 25%, about 30%, about 35%, about 40%, about 45%, about 50%, about 55%, or about 60% of the first heat exchange fluid that encounters the third branching point 92. The remainder, or balancing percentage, of the first heat exchange fluid that encounters the third branching point 92 and is not diverted toward the first expansion valve 96 can continue toward the second region 104 of the vapor generator 56. It is contemplated that in different modes of operation of the heat pump 20, the percentage of the first heat exchange fluid that is received by the first expansion valve 96 may vary.

Referring further to FIGS. 2-4, the portion of the first heat exchange fluid that is diverted toward the first expansion valve 96 flows through the first expansion valve 96 and is directed toward an inlet 240 of the first region 100 of the vapor generator 56. This diverted portion of the first heat exchange fluid flows through the first region 100 and exits the vapor generator 56 at an outlet 244 of the vapor generator 56. The portion of the first heat exchange fluid that was diverted toward the first expansion valve 96 decreases in pressure and temperature as a result of interaction with the first expansion valve 96. Accordingly, the first heat exchange fluid flowing through the first region 100 of the vapor generator 56 has a lower pressure and temperature than the first heat exchange fluid flowing through the second region 104. Therefore, the first heat exchange fluid within the first region 100 thermally interacts with the first heat exchange fluid flowing through the second region 104 of the vapor generator 56.

Referring still further to FIGS. 2-4, as a result of the thermal interaction between the first heat exchange fluid within the first region 100 and the first heat exchange fluid within the second region 104, the first heat exchange fluid within the first region 100 exits the vapor generator 56 at the outlet 244 of the first region 100 at a higher temperature, pressure, and/or vapor percentage than the first heat exchange fluid that entered the inlet 240 of the first region 100. The first heat exchange fluid that exits the first region 100 by way of the outlet 244 is directed toward the mid-pressure inlet 36 of the compressor 28. The first heat exchange fluid from the first region 100 of the vapor generator 56 is injected into the compressor 28. The injection of the first heat exchange fluid at the mid-pressure inlet 36 of the compressor 28 can improve efficiency of the refrigerant loop 24 and/or increase a heat exchange capacity of the refrigerant loop 24. For example, the injection the first heat exchange fluid at the mid-pressure inlet 36 of the compressor 28 can increase a condensing capacity of the refrigerant loop 24 while decreasing a load experienced by the compressor 28. The improved condensing capacity of the refrigerant loop 24 and the decreased load on the compressor 28 can contribute to performance and efficiency improvements for the heat pump 20 and/or the refrigerant loop 24. Additionally, the injection of the first heat exchange fluid at the mid-pressure inlet 36 can increase an ambient temperature operating range of the heat pump 20 and/or the refrigerant loop 24.

Referring again to FIGS. 2-4, the portion of the first heat exchange fluid that was not diverted toward the first expansion valve 96 and instead flowed toward an inlet 248 of the second region 104 of the vapor generator 56 thermally interacts with the first heat exchange fluid that was diverted toward the first expansion valve 96. During this thermal interaction between the first heat exchange fluid within the second region 104 and the first exchange fluid within the first region 100, heat is transferred from the first heat exchange fluid within the second region 104 to the first heat exchange fluid within the first region 100. Accordingly, the first heat exchange fluid exiting the vapor generator 56 at an outlet 252 of the second region 104 may be at a different temperature, pressure, and/or vapor percentage than the first heat exchange fluid that entered the inlet 248. For example, the first heat exchange fluid that exits the vapor generator 56 at the outlet 252 of the second region 104 may have a lower temperature and pressure than when the first heat exchange fluid that entered the inlet 248 of the second region 104. Upon exiting the outlet 252 of the second region 104, the first heat exchange fluid is directed toward the fourth branching point 108.

Referring yet again to FIGS. 2-4, in these modes of operation, the fifth shutoff valve 112 is in an open position and the second expansion valve 116 is operated as a shutoff valve that is in a closed position. Accordingly, the first heat exchange fluid received at the fourth branching point 108 passes through the fourth branching point 108, as well as the fifth shutoff valve 112. After exiting the fifth shutoff valve 112, the first heat exchange fluid is directed toward the third coupling point 124. With the third shutoff valve 80 in the closed position, the first heat exchange fluid is directed toward the fifth branching point 128 from the third coupling point 124. In each of these modes of operation, the sixth shutoff valve 136 is in a closed position such that the first heat exchange fluid that encounters the fifth branching point 128 is directed toward the sixth branching point 132.

With specific reference to FIGS. 2 and 3, at the sixth branching point 132, the refrigerant network of conduits 64 splits into a first path and a second path, with the first path leading toward the third heat exchanger 144 and the second path leading toward the fourth heat exchanger 152. For the time being, focus is directed toward the first path that leads toward the third heat exchanger 144. From the sixth branching point 132, at least a portion of the first heat exchange fluid is directed to the third expansion valve 140. The first heat exchange fluid decreases in pressure and temperature as a result of interaction with the third expansion valve 140. From the third expansion valve 140, the first heat exchange fluid is directed to an inlet 256 of the third heat exchanger 144. The decreased temperature and pressure of the first heat exchange fluid flowing through the third heat exchanger 144 can be employed to provide cooling to air that is flowing through the ductwork 164 with which the third heat exchanger 144 is in fluid communication. Accordingly, the first heat exchange fluid that exits the third heat exchanger 144 by way of an outlet 260 of the third heat exchanger 144 may have an increased pressure, temperature, and/or vapor percentage than the first heat exchange fluid that entered the third heat exchanger 144 at the inlet 256. Upon exiting the third heat exchanger 144 by way of the outlet 260, the first heat exchange fluid flows through the first check valve 156. After exiting the first check valve 156, the first heat exchange fluid is directed toward the accumulator 172 by the refrigerant network of conduits 64. In the mode of operation depicted in FIG. 2, the second check valve 160 prevents backflow toward the fourth heat exchanger 152. Accordingly, the fourth heat exchanger 152 is prevented from becoming a storage vessel for the first heat exchange fluid when the fourth heat exchanger 152 is not employed in a given mode of operation. From the first check valve 156, the first heat exchange fluid flows toward the accumulator 172. On the way to the accumulator 172, the first heat exchange fluid flows through the fourth coupling point 168. The accumulator 172 receives the first heat exchange fluid and provides a gaseous component of the first heat exchange fluid to the low-pressure inlet 32 of the compressor 28.

Referring particularly to FIGS. 3 and 4, in the mode of operation depicted in FIG. 3, the first heat exchange fluid is split into a first portion that follows the first path in the manner described above and a second portion that follows the second path, as will be described below. In the mode of operation depicted in FIG. 4, an entirety of the first heat exchange fluid that encounters the sixth branching point 132 is directed along the second path toward the fourth heat exchanger 152. From the sixth branching point 132, at least a portion of the first heat exchange fluid is directed toward the fourth heat exchanger 152. Prior to reaching the fourth heat exchanger 152, the first heat exchange fluid first encounters the fourth expansion valve 148. The first heat exchange fluid decreases in pressure and temperature as a result of interaction with the fourth expansion valve 148. From the fourth expansion valve 148, the first heat exchange fluid is directed to a first inlet 264 of the fourth heat exchanger 152. The decreased temperature and pressure of the first heat exchange fluid that was provided by the fourth expansion valve 148 may be employed to provide cooling to a second, or third, heat exchange fluid that is also flowing through the fourth heat exchanger 152, as will be discussed further herein. Therefore, the first heat exchange fluid that exits the fourth heat exchanger 152 by way of a first outlet 268 thereof may have an increased pressure, temperature, and/or vapor percentage when compared to the first heat exchange fluid that entered the fourth heat exchanger 152 at the first inlet 264.

Referring again to FIGS. 3 and 4, from the first outlet 268 of the fourth heat exchanger 152, the first heat exchange fluid is directed to the second check valve 160 by the refrigerant network of conduits 64. The first heat exchange fluid flows through the second check valve 160 and is directed toward the accumulator 172. In the mode of operation depicted in FIG. 3, after exiting the second check valve 160, the second portion of the first heat exchange fluid is rejoined, or recombined, with the first portion of the first heat exchange fluid prior to reaching the accumulator 172. In the mode of operation depicted in FIG. 4, the first check valve 156 prevents back flow toward the third heat exchanger 144. Accordingly, the third heat exchanger 144 is prevented from becoming a storage vessel for the first heat exchange fluid when the third heat exchanger 144 is not employed in a given mode of operation. On the way to the accumulator 172, the first heat exchange fluid passes through the fourth coupling point 168. The accumulator 172 receives the first heat exchange fluid and performs as described above, thereby completing the traversal of the refrigerant loop 24.

Referring further to FIGS. 3 and 4, the second, or third, heat exchange fluid flows between the fourth heat exchanger 152 and the first heat-producing component 192. More specifically, a first inlet 272 of the first heat-producing component 192 receives the second, or third, heat exchange fluid from the fourth heat exchanger 152. The first heat-producing component 192 can be an engine, electronics, battery, battery pack, one or more heating elements, brakes, or the like. The second, or third, heat exchange fluid received at the first inlet 272 of the first heat-producing component 192 can decrease a temperature of the first heat-producing component 192. More specifically, the decreased temperature, pressure, and/or vapor percentage provided to the first heat exchange fluid flowing through the fourth heat exchanger 152 as a result of interaction with the fourth expansion valve 148 can be employed for thermal exchange with the second, or third, heat exchange fluid. Accordingly, the second, or third, heat exchange fluid that exits the fourth heat exchanger 152 may have a decreased temperature, pressure, and/or vapor percentage when compared to the second, or third, heat exchange fluid that entered the fourth heat exchanger 152. Therefore, the second, or third, heat exchange fluid that exits the first heat-producing component 192 by way of a first outlet 276 thereof may have a greater pressure, temperature, and/or vapor percentage than the second, or third, heat exchange fluid that was received at the first inlet 272. The first heat-producing component 192 is further plumbed to the coolant loop 176, as will be discussed in further detail herein.

Referring still further to FIGS. 3 and 4, from the first outlet 276 of the first heat-producing component 192, the second, or third, heat exchange fluid is directed toward a second inlet 280 of the fourth heat exchanger 152. The first heat exchange fluid received at the first inlet 264 and the second, or third, heat exchange fluid received at the second inlet 280 can thermally interact with one another within the fourth heat exchanger 152. The second, or third, heat exchange fluid that is received at the second inlet 280 exits the fourth heat exchanger 152 by way of a second outlet 284 thereof. From the second outlet 284 of the fourth heat exchanger 152, the second, or third, heat exchange fluid is directed back toward the first inlet 272 of the first heat-producing component 192. In each of these modes of operation, the first heat-producing component 192 may be cooled as a result of the thermal exchange between the first heat exchange fluid and the second, or third, heat exchange fluid.

Referring now to FIGS. 5-16, as stated above, at the first branching point 60, the refrigerant loop 24 splits into the first path and the second path, with the first shutoff valve 68 being positioned along the first path and the second shutoff valve 72 being positioned along the second path. In the modes of operation depicted in FIGS. 5-9 and 12-16, the first shutoff valve 68 is in the open position and the second shutoff valve 72 is in the closed position. Accordingly, in the modes of operation depicted in FIGS. 5-9 and 12-16, an entirety of the first heat exchange fluid that encounters the first branching point 60 is directed toward the first shutoff valve 68. The first heat exchange fluid that flows toward the first shutoff valve 68 passes through the first shutoff valve 68 and continues on toward the first coupling point 88. In the modes of operation depicted in FIGS. 10 and 11, the first shutoff valve 68 is in the closed position and the second shutoff valve 72 is in the open position. Accordingly, in the modes of operation depicted in FIGS. 10 and 11, an entirety of the first heat exchange fluid that encounters the first branching point 60 is directed along the second path toward the second shutoff valve 72. As will be discussed in further detail herein with regard to FIGS. 10 and 11, the first heat exchange fluid that is directed along the second path toward the second shutoff valve 72 ultimately encounters the first coupling point 88 further downstream.

Referring again to FIGS. 5-16, from the first coupling point 88, the first heat exchange fluid is directed toward the third branching point 92. As described above, at the third branching point 92, a portion of the first heat exchange fluid is diverted toward the first expansion valve 96, while the remaining portion of the first heat exchange fluid continues toward the second region 104 of the vapor generator 56. The vapor generator 56 operates as already described. The first heat exchange fluid that exits the first region 100 by way of the outlet 244 is directed toward the mid-pressure inlet 36 of the compressor 28. The portion of the first heat exchange fluid that exits the second region 104 by way of the outlet 252 of the second region 104 is directed toward the fourth branching point 108.

Referring to FIGS. 5-9 and 12-16, the fifth shutoff valve 112 is in the closed position in each of these modes of operation. Accordingly, from the fourth branching point 108, the first heat exchange fluid is directed toward the second expansion valve 116. The first heat exchange fluid decreases in pressure and temperature as a result of interaction with the second expansion valve 116. From the second expansion valve 116, the first heat exchange fluid is directed to the inlet 232 of the second heat exchanger 52. With the first heat exchange fluid having decreased in temperature and pressure as a result of interaction with the second expansion valve 116, the first heat exchange fluid may absorb heat from the heat exchange fluid that is external to the refrigerant loop 24 and the coolant loop 176 by way of the second heat exchanger 52. Therefore, the first heat exchange fluid that exits the second heat exchanger 52 by way of the outlet 236 thereof may have an increased pressure, temperature, and/or vapor percentage when compared to the first heat exchange fluid that entered the second heat exchanger 52 at the inlet 232. The third shutoff valve 80 is in the open position and the fourth shutoff valve 84 is in the closed position. Accordingly, from the outlet 236 of the second heat exchanger 52, the first heat exchange fluid is directed to the fifth branching point 128 after flowing through the third coupling point 124, the second branching point 76, and the third shutoff valve 80.

Figure 10:
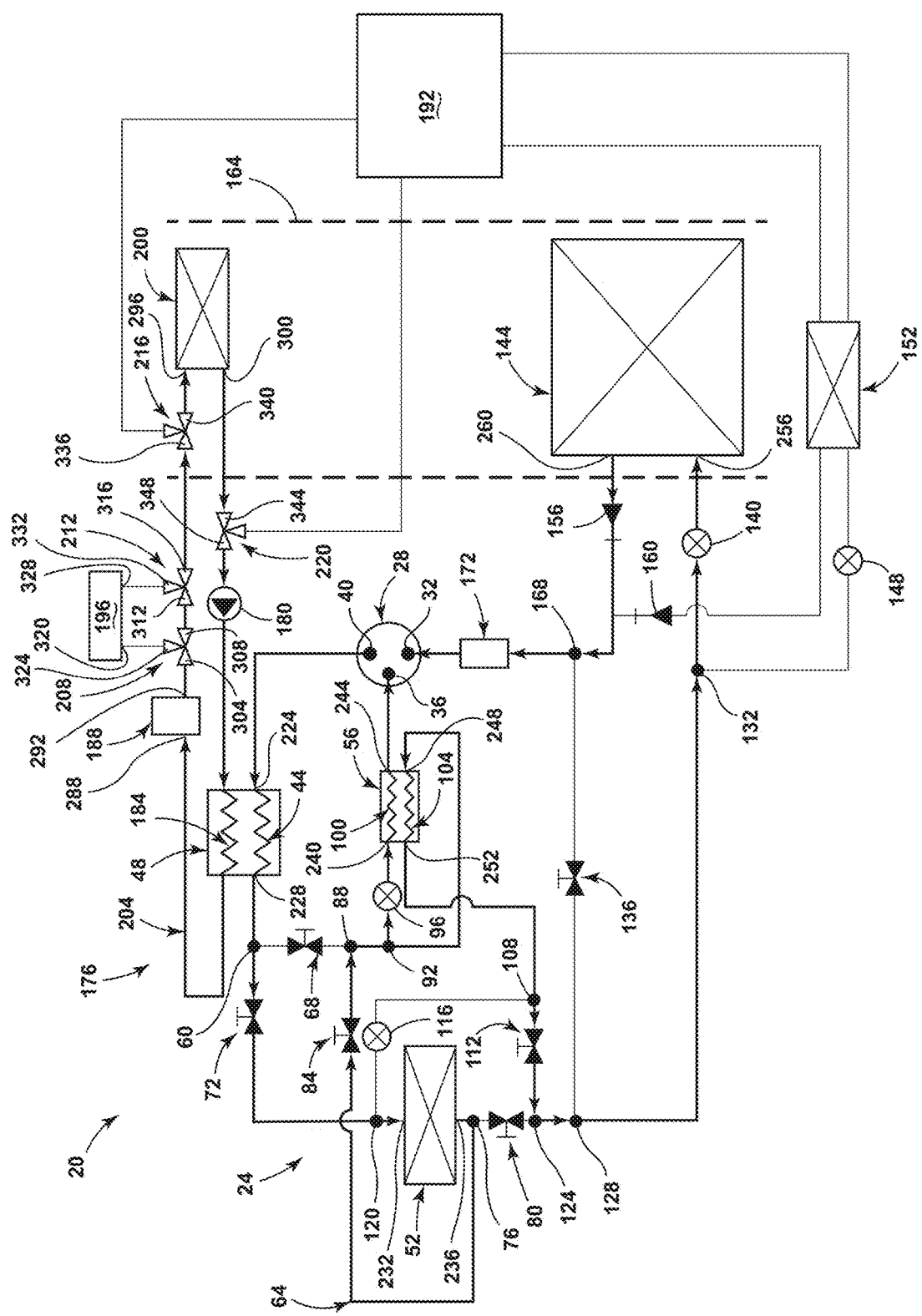
FIG. 10 is a schematic representation of the heat pump arrangement, illustrating a reheat mode of operation with serial condensing, according to one example.
Figure 11:
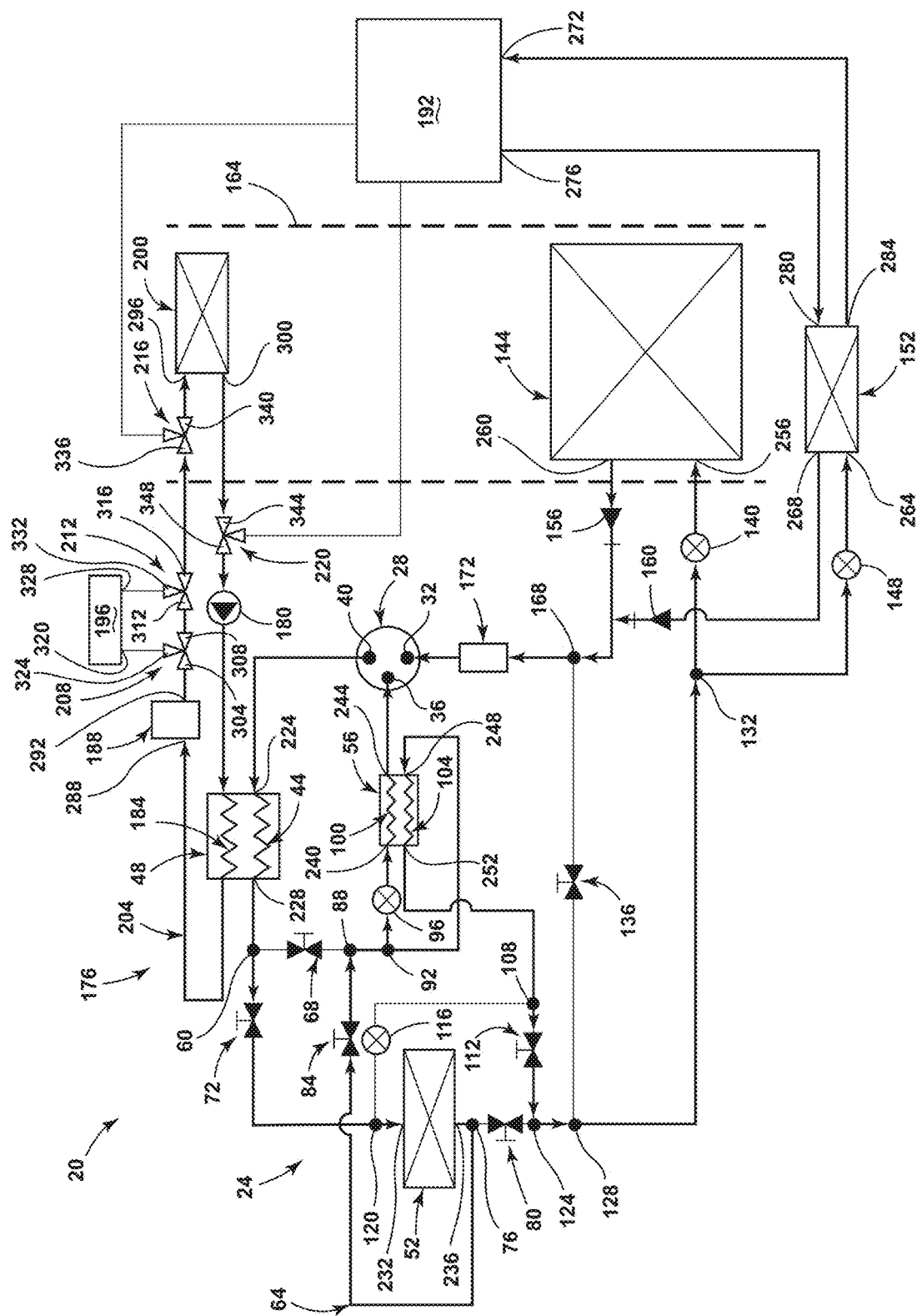
FIG. 11 is a schematic representation of the heat pump arrangement, illustrating a reheat and battery cooling mode of operation with serial condensing, according to one example.
Figure 12:
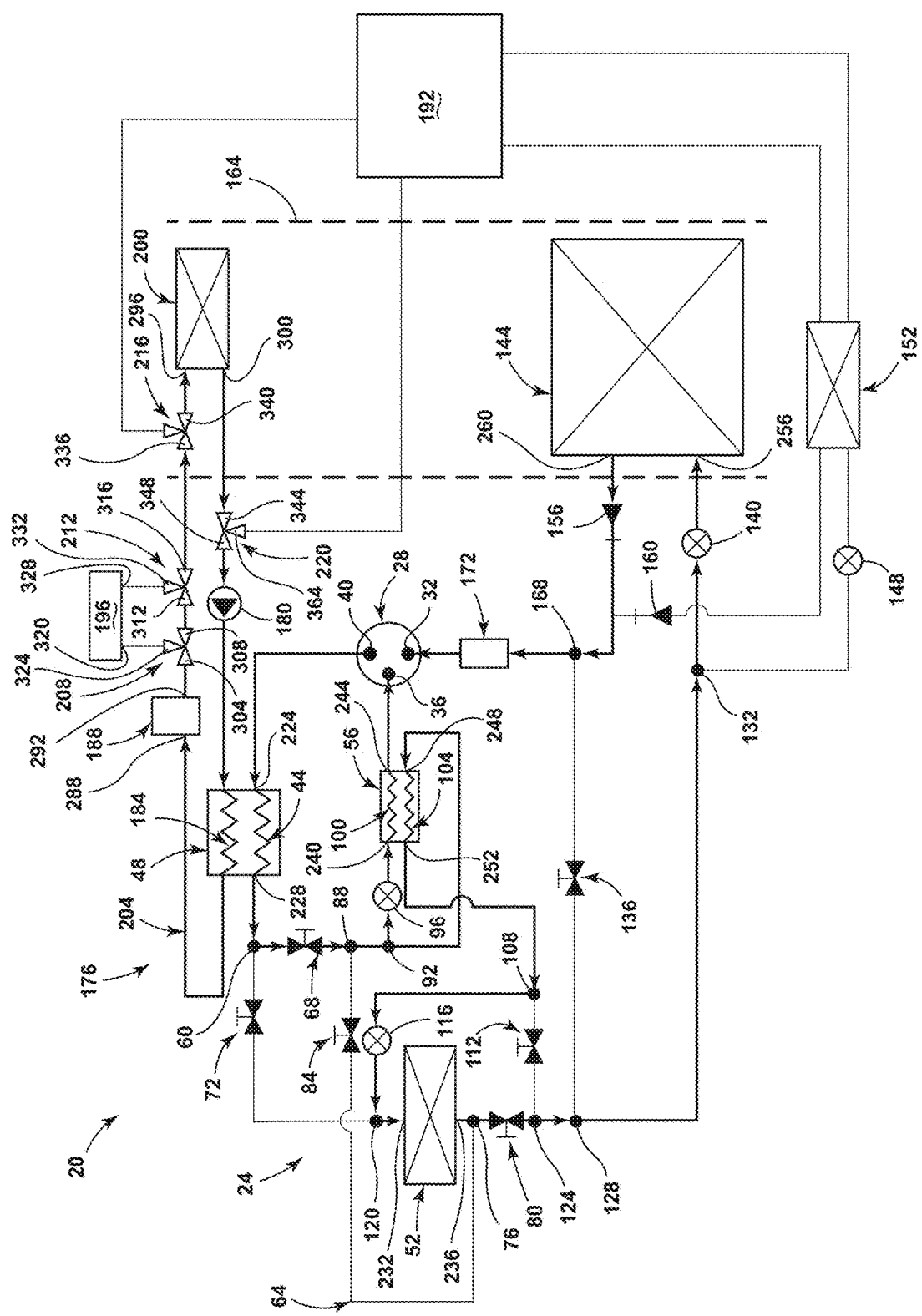
FIG. 12 is a schematic representation of the heat pump arrangement, illustrating a cabin dehumidification mode of operation with serial evaporation, according to one example.
Figure 13:
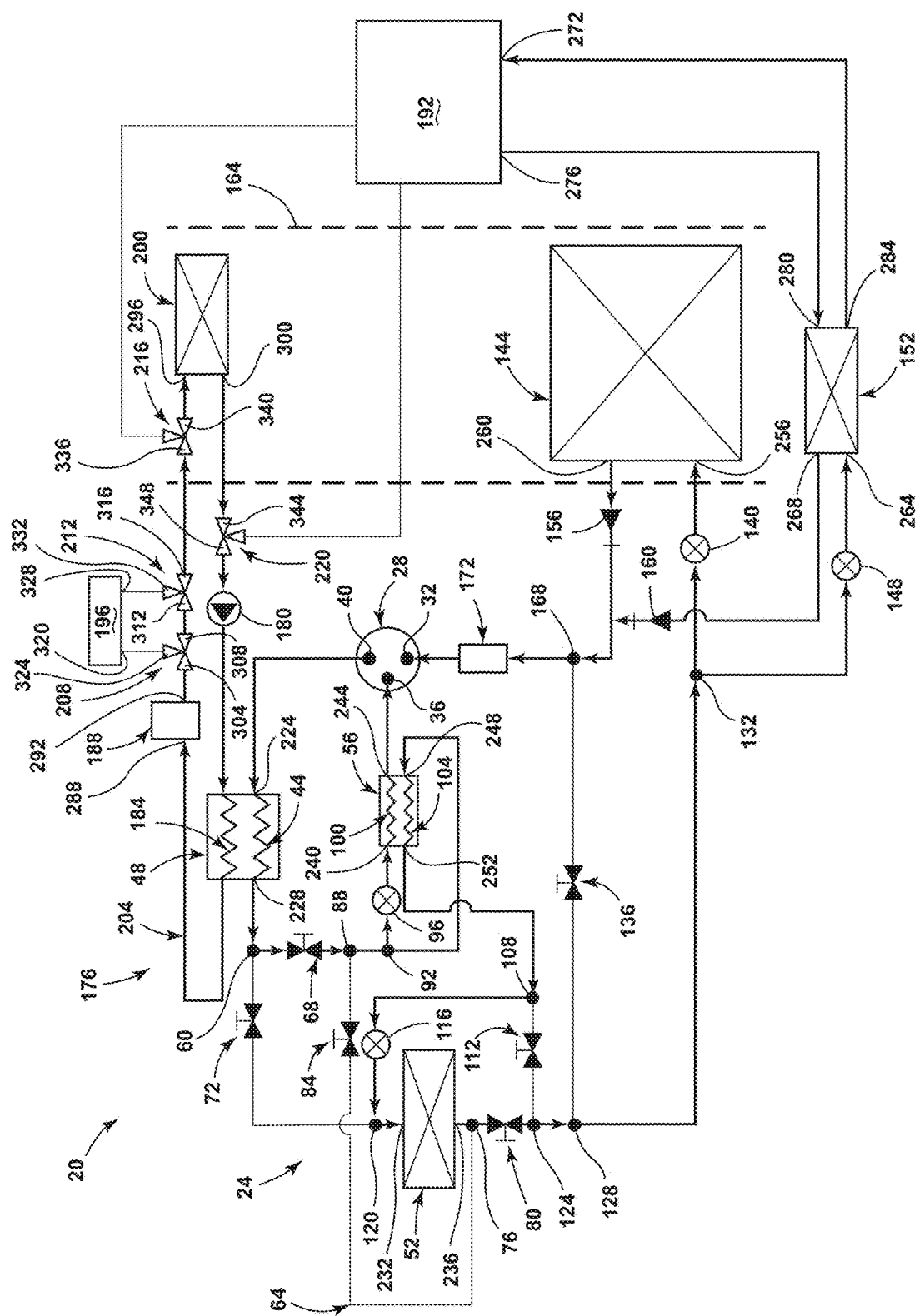
FIG. 13 is a schematic representation of a heat pump arrangement, illustrating a cabin dehumidification and battery cooling mode of operation with serial evaporation, according to one example.
Figure 14:
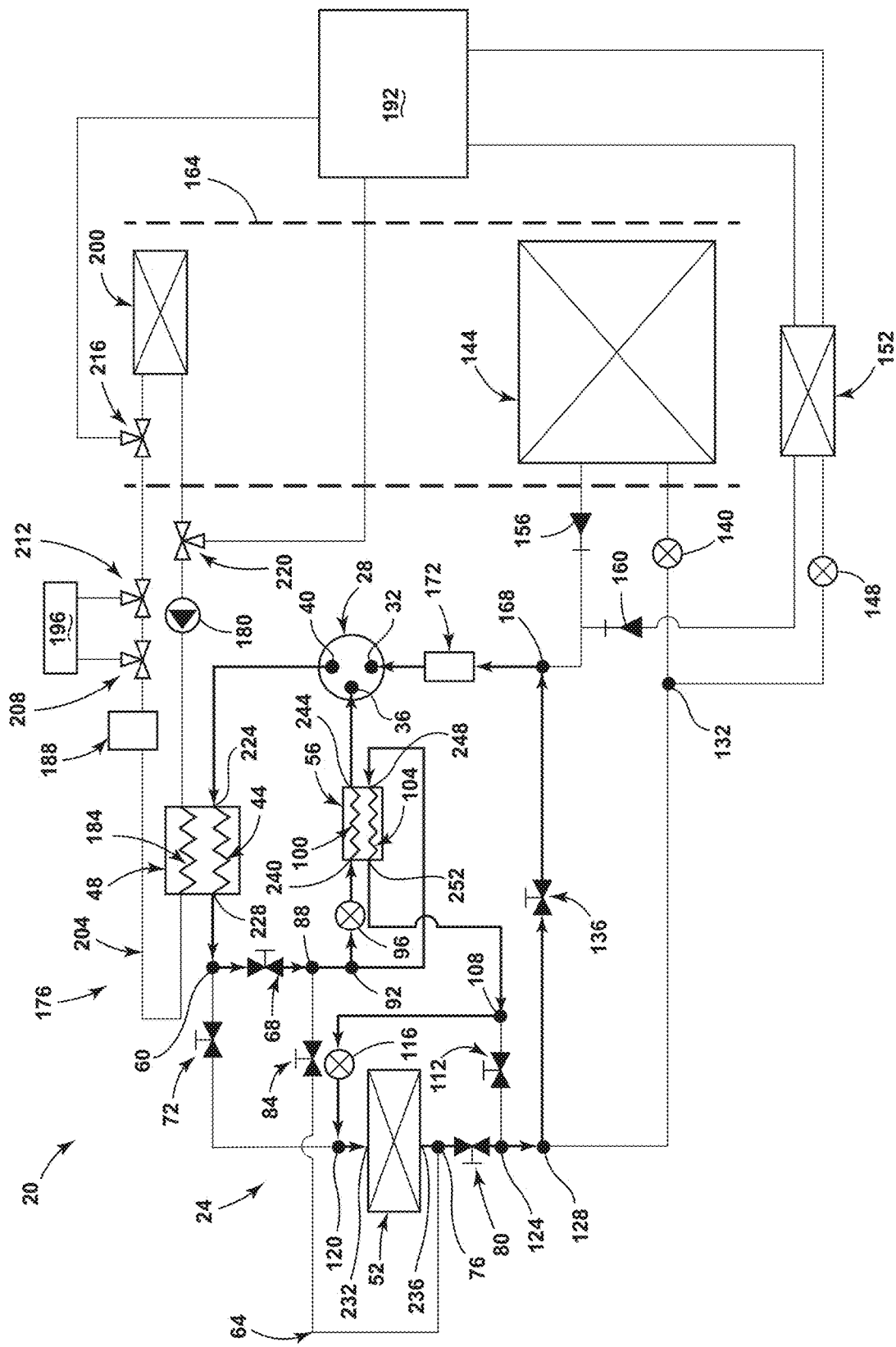
FIG. 14 is a schematic representation of the heat pump arrangement, illustrating a deice mode of operation, according to one example.

With specific reference to FIGS. 10 and 11, the first heat exchange fluid that is directed toward the second shutoff valve 72 passes through the second shutoff valve 72 and continues toward the inlet 232 of the second heat exchanger 52. On the way to the inlet 232 of the second heat exchanger 52, the first heat exchange fluid passes through the second coupling point 120. The second heat exchanger 52 receives the first heat exchange fluid and the second heat exchanger 52 performs as already described. The first heat exchange fluid exits the second heat exchanger 52 by way of the outlet 236 thereof. In each of these modes of operation, the third shutoff valve 80 is in the closed position and the fourth shutoff valve 84 is in the open position. Accordingly, the first heat exchange fluid that encounters the second branching point 76 after exiting the second heat exchanger 52 is directed toward the fourth shutoff valve 84. After passing through the fourth shutoff valve 84, the first heat exchange fluid is directed toward the first coupling point 88. The first heat exchange fluid flows from the first coupling point 88 to the fourth branching point 108 as already described. In these modes of operation, the fifth shutoff valve 112 is in the open position and the second expansion valve 116 operates as a shutoff valve that is in a closed position. Accordingly, from the fourth branching point 108, the first heat exchange fluid passes through the fifth shutoff valve 112 and encounters the third coupling point 124. From the third coupling point 124, the first heat exchange fluid is directed toward the fifth branching point 128.

Referring now to FIGS. 5, 7-9, and 14-16, the sixth shutoff valve 136 is in the open position in each of these modes of operation. Accordingly, at least a portion of the first heat exchange fluid that encounters the fifth branching point 128 is directed toward the sixth shutoff valve 136. The portion of the first heat exchange fluid that is directed toward the sixth shutoff valve 136 passes through the sixth shutoff valve 136 and continues toward the fourth coupling point 168. At the fourth coupling point 168, if a portion of the first heat exchange fluid was directed toward the sixth branching point, then the first heat exchange fluid is recombined, or rejoined, at the fourth coupling point 168, as will be discussed further herein. From the fourth coupling point 168, the first heat exchange fluid is directed toward the accumulator 172. The accumulator 172 performs as already described.

Figure 7:
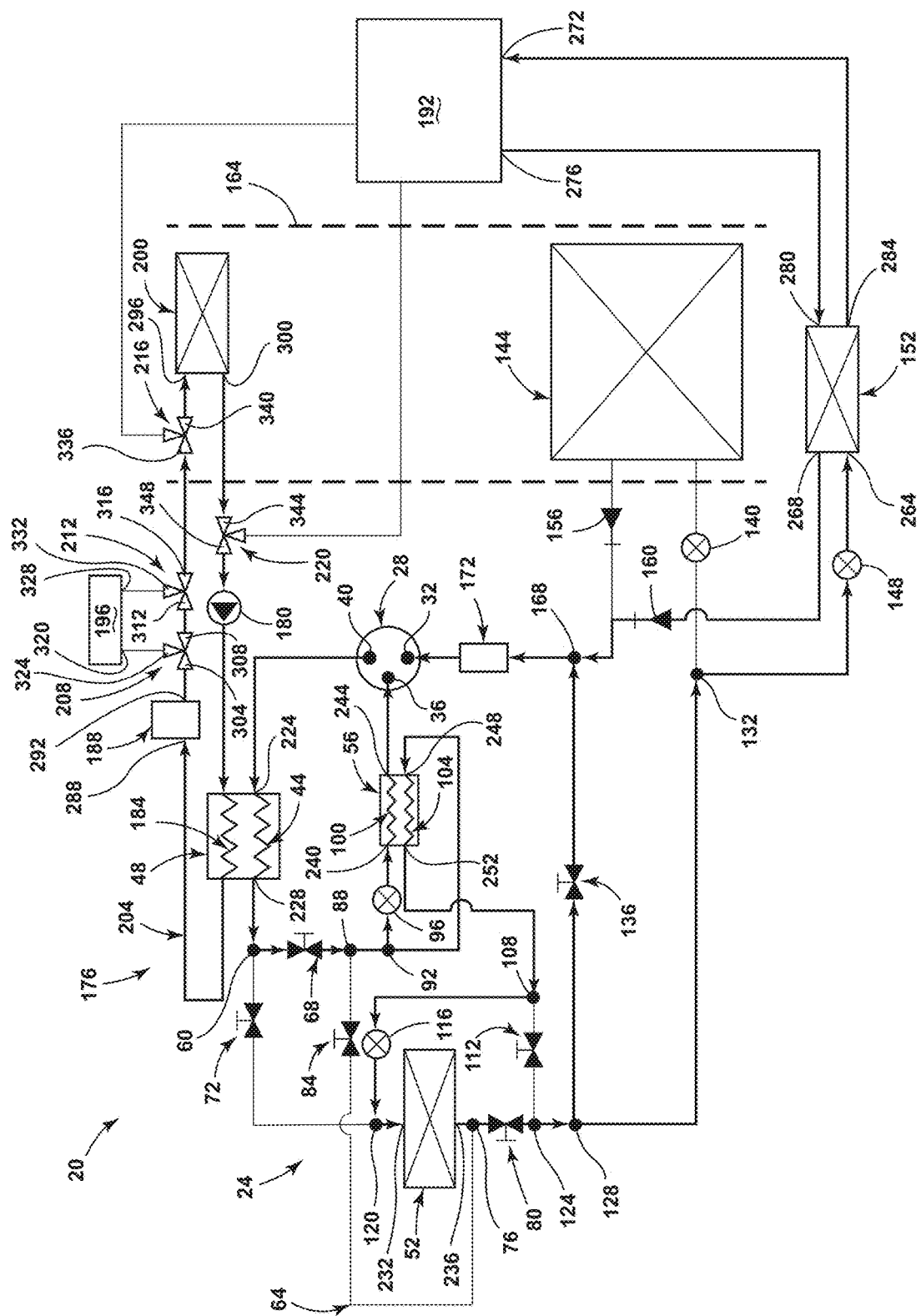
FIG. 7 is a schematic representation of the heat pump arrangement, illustrating a parallel cabin heating and battery cooling mode of operation, according to one example.
Figure 15:
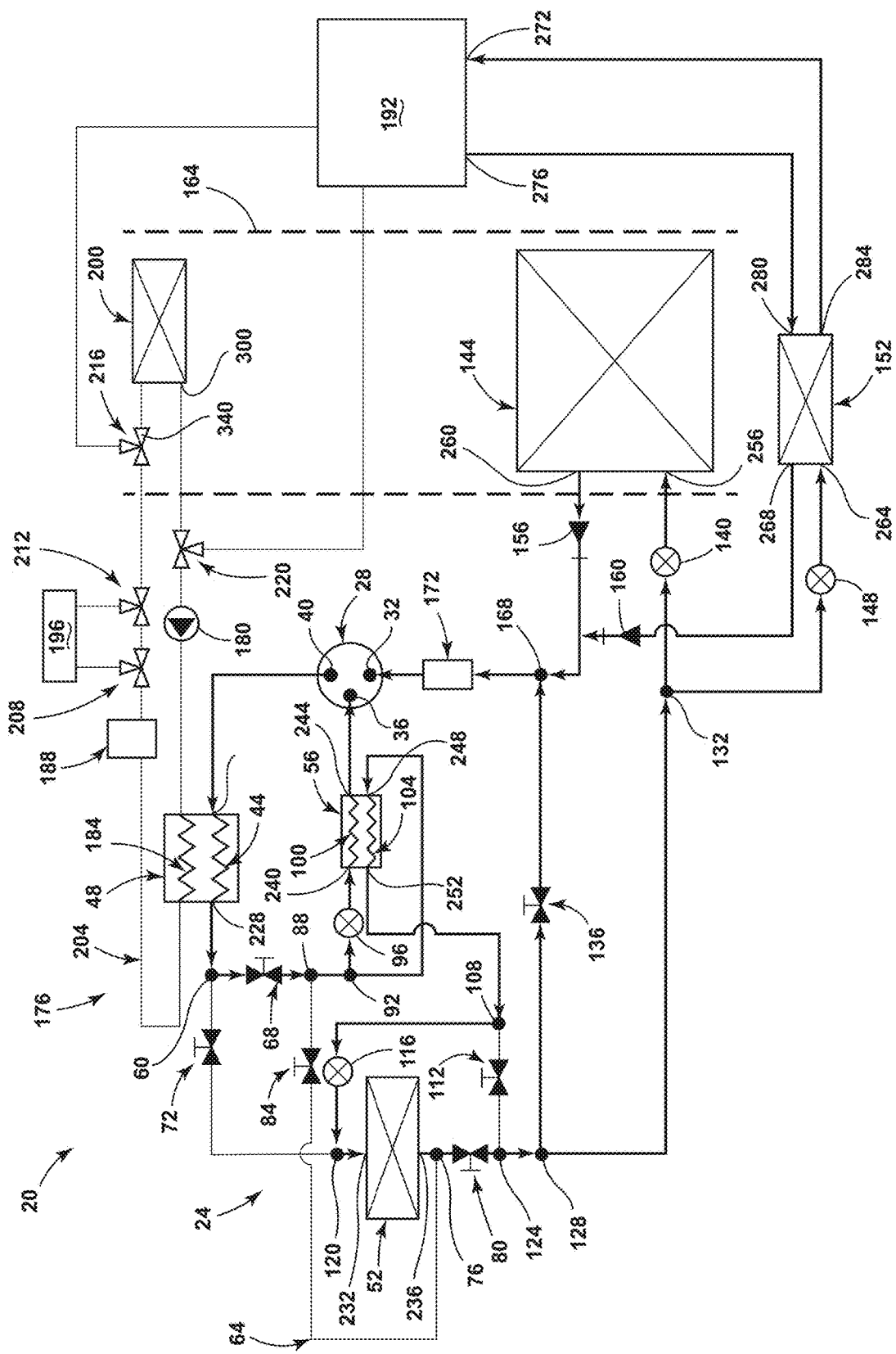
FIG. 15 is a schematic representation of the heat pump arrangement, illustrating a deice and battery cooling mode of operation, according to one example.
Figure 16:
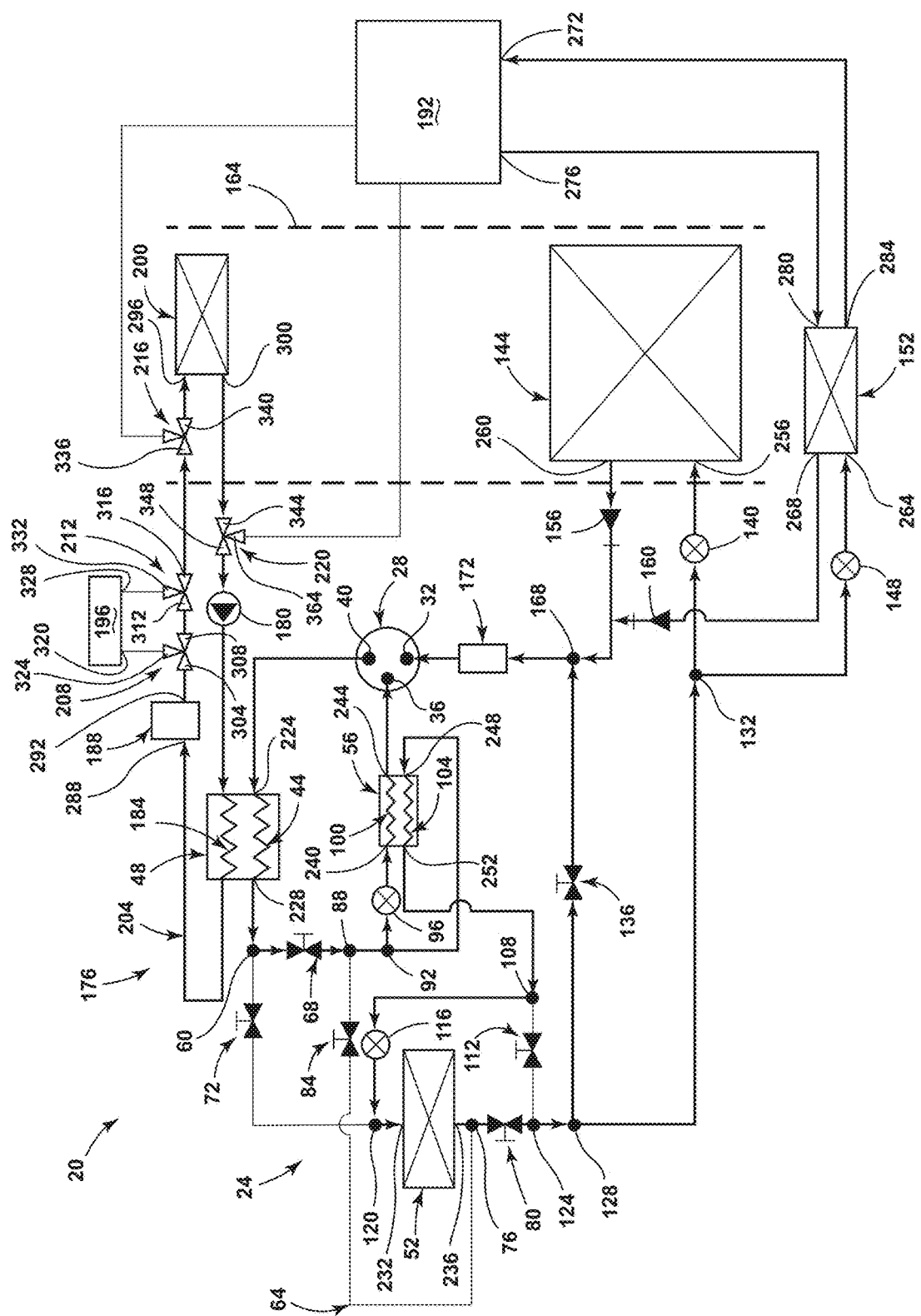
FIG. 16 is a schematic representation of the heat pump arrangement, illustrating a cabin heating, deice, and battery cooling mode of operation.

Referring to FIGS. 6-7, 10-13 and 15-16, at least a portion of the first heat exchange fluid that encounters the fifth branching point 128 is directed toward the sixth branching point 132. More specifically, in the modes of operation depicted in FIGS. 7, 15, and 16, the first heat exchange fluid is split into a first portion and a second portion at the fifth branching point 128. In FIGS. 7, 15, and 16, the first portion of the first heat exchange fluid follows the first path toward the sixth branching point 132 and the second portion of the first heat exchange fluid follows the second path toward the sixth shutoff valve 136. The flow of the first heat exchange fluid along the second path toward the sixth shutoff valve 136 has already been described. In some examples for the mode of operation depicted in FIG. 7, the sixth shutoff valve 136 may be pulsed between the open position and the closed position to moderate a proportion of the first heat exchange fluid that is directed toward the sixth branching point 132 and ultimately used to cool the first heat-producing component 192. In various examples for the mode of operation depicted in FIG. 7, a degree of openness of the sixth shutoff valve 136 (e.g., percent open) may be adjusted to moderate a proportion of the first heat exchange fluid that is directed toward the sixth branching point 132 and ultimately used to cool the first heat-producing component 192. In the modes of operation depicted in FIGS. 6 and 10-13, an entirety of the first heat exchange fluid that encounters the fifth branching point 128 is directed toward the sixth branching point 132.

Referring now to FIGS. 6, 7, 11, 13, and 15-16, as stated above, at the sixth branching point 132, the refrigerant network of conduits 64 splits into a first path that leads toward the third expansion valve 140 and a second path that leads toward the fourth expansion valve 148. In each of these modes of operation, when the first heat exchange fluid encounters the sixth branching point 132, at least a portion of the first heat exchange fluid is directed along the second path toward the fourth expansion valve 148. In the modes of operation depicted in FIGS. 11, 13, 15, and 16, the first heat exchange fluid is divided into a first portion that follows the first path and a second portion that follows the second path. The at least a portion of the first heat exchange fluid that follows the second path is directed toward the fourth expansion valve 148. The first heat exchange fluid decreases in pressure and temperature as a result of interaction with the fourth expansion valve 148. From the fourth expansion valve 148, the first heat exchange fluid is directed to the first inlet 264 of the fourth heat exchanger 152. The fourth heat exchanger 152 performs as already described. The first heat exchange fluid exits the fourth heat exchanger 152 by way of the first outlet 268 thereof.

Referring again to FIGS. 6, 7, 11, 13, and 15-16, from the first outlet 268 of the fourth heat exchanger 152, the first heat exchange fluid is directed to the second check valve 160 by the refrigerant network of conduits 64. The first heat exchange fluid flows through the second check valve 160 and is directed toward the accumulator 172. In the modes of operation depicted in FIGS. 11, 13, 15, and 16, after exiting the second check valve 160, the portion of the first heat exchange fluid that was directed toward the fourth expansion valve 148 is rejoined, or recombined, with the portion of the first heat exchange fluid that was directed toward the third expansion valve 140 prior to reaching the accumulator 172. In the modes of operation depicted in FIGS. 6 and 7, the first check valve 156 prevents back flow toward the third heat exchanger 144. Accordingly, the third heat exchanger 144 is prevented from becoming a storage vessel for the first heat exchange fluid when the third heat exchanger 144 is not employed in a given mode of operation. On the way to the accumulator 172, the first heat exchange fluid passes through the fourth coupling point 168. In the modes of operation depicted in FIGS. 7, 15, and 16, as the first heat exchange fluid from the first check valve 156 and/or the second check valve 160 passes through the fourth coupling point 168, the first heat exchange fluid is rejoined, or recombined, with the portion of the first heat exchange fluid that was directed toward the sixth shutoff valve 136 at the fifth branching point 128. The accumulator 172 receives the first heat exchange fluid and performs as described above.

Referring further to FIGS. 6, 7, 11, 13, and 15-16, the second, or third, heat exchange fluid flows between the fourth heat exchanger 152 and the first heat-producing component 192. More specifically, the first inlet 272 of the first heat-producing component 192 receives the second, or third, heat exchange fluid from the fourth heat exchanger 152. The second, or third, heat exchange fluid received at the first inlet 272 of the first heat-producing component 192 can decrease a temperature of the first heat-producing component 192. More specifically, the decreased temperature, pressure, and/or vapor percentage provided to the first heat exchange fluid flowing through the fourth heat exchanger 152 as a result of interaction with the fourth expansion valve 148 can be employed for thermal exchange with the second, or third, heat exchange fluid. Accordingly, the second, or third, heat exchange fluid that exits the fourth heat exchanger 152 may have a decreased temperature, pressure, and/or vapor percentage when compared to the second, or third, heat exchange fluid that entered the fourth heat exchanger 152. Therefore, the second, or third, heat exchange fluid that exits the first heat-producing component 192 by way of the first outlet 276 thereof may have a greater pressure, temperature, and/or vapor percentage than the second, or third, heat exchange fluid that was received at the first inlet 272. The first heat-producing component 192 is further plumbed to the coolant loop 176, as will be discussed in further detail herein.

Referring still further to FIGS. 6, 7, 11, 13, and 15-16, from the first outlet 276 of the first heat-producing component 192, the second, or third, heat exchange fluid is directed toward the second inlet 280 of the fourth heat exchanger 152. The first heat exchange fluid received at the first inlet 264 and the second, or third, heat exchange fluid received at the second inlet 280 can thermally interact with one another within the fourth heat exchanger 152. The second, or third, heat exchange fluid that is received at the second inlet 280 exits the fourth heat exchanger 152 by way of the second outlet 284 thereof. From the second outlet 284 of the fourth heat exchanger 152, the second, or third, heat exchange fluid is directed back toward the first inlet 272 of the first heat-producing component 192. In each of these modes of operation, the first heat-producing component 192 may be cooled as a result of the thermal exchange between the first heat exchange fluid and the second, or third, heat exchange fluid.

Referring now to FIGS. 10-13 and 15-16, as stated above, at the sixth branching point 132, the refrigerant network of conduits 64 splits into the first path that leads toward the third expansion valve 140 and the second path that leads toward the fourth expansion valve 148. The flow of the portion of the first heat exchange fluid that is directed along the second path has been described above for the relevant modes of operation. From the sixth branching point 132, at least a portion of the first heat exchange fluid is directed along the first path toward the third expansion valve 140. The first heat exchange fluid decreases in pressure and temperature as a result of interaction with the third expansion valve 140. From the third expansion valve 140, the first heat exchange fluid is directed to the inlet 256 of the third heat exchanger 144. The decreased temperature and pressure of the first heat exchange fluid flowing through the third heat exchanger 144 can be employed to provide cooling to air that is flowing through the ductwork 164 with which the third heat exchanger 144 is in fluid communication. Accordingly, the first heat exchange fluid that exits the third heat exchanger 144 by way of the outlet 260 of the third heat exchanger 144 may have an increased pressure, temperature, and/or vapor percentage than the first heat exchange fluid that entered the third heat exchanger 144 at the inlet 256.

Referring again to FIGS. 10-13 and 15-16, upon exiting the third heat exchanger 144 by way of the outlet 260, the first heat exchange fluid flows through the first check valve 156. After exiting the first check valve 156, the first heat exchange fluid is directed toward the accumulator 172 by the refrigerant network of conduits 64. In the modes of operation depicted in FIGS. 10 and 12, the second check valve 160 prevents backflow toward the fourth heat exchanger 152. Accordingly, the fourth heat exchanger 152 is prevented from becoming a storage vessel for the first heat exchange fluid when the fourth heat exchanger 152 is not employed in a given mode of operation. From the first check valve 156, the first heat exchange fluid flows toward the accumulator 172. In the modes of operation depicted in FIGS. 11, 13, and 15-16, the portion of the first heat exchange fluid that was directed toward the third expansion valve 140 at the sixth branching point 132 and the portion of the first heat exchange fluid that was directed toward the fourth expansion valve 148 at the sixth branching point 132 are rejoined, or recombined, prior to reaching the fourth coupling point 168. In the modes of operation depicted in FIGS. 15 and 16, when the first heat exchange fluid flows through the fourth coupling point 168, the first heat exchange fluid from the first and second check valves 156, 160 is rejoined, or recombined, with the first heat exchange fluid that was directed toward the sixth shutoff valve 136 at the fifth branching point 128. The accumulator 172 receives the first heat exchange fluid from the fourth coupling point 168 and performs as already described.

Referring to FIGS. 5-13 and 16, various modes of operation of the heat pump 20 that employ the coolant loop 176 are depicted. The pump 180 is activated in these modes of operation such that the second heat exchange fluid is circulated through the components of the coolant loop 176. The second heat exchange fluid is driven from the pump 180 toward the first heat exchanger 48. Accordingly, the second heat exchange fluid thermally interacts with the first heat exchange fluid by way of the first heat exchanger 48. More specifically, the second heat exchange fluid is circulated through the second region 184 of the first heat exchanger 48 while the first heat exchange fluid is circulated through the first region 44 of the first heat exchanger 48. In various examples, the second heat exchange fluid may extract heat from the first heat exchange fluid at the first heat exchanger 48. From the first heat exchanger 48, the second heat exchange fluid is directed to an inlet 288 of the reservoir 188 by the coolant network of conduits 204. The reservoir 188 can accumulate the second heat exchange fluid. An outlet 292 of the reservoir 188 is plumbed to an inlet 296 of the fifth heat exchanger 200 by the coolant network of conduits 204. In various examples, additional components can be included with the coolant loop 176 and plumbed between the outlet 292 of the reservoir 188 and the inlet 296 of the fifth heat exchanger 200, as will be discussed in further detail herein.

Referring specifically to FIGS. 5-8, 10-13, and 16, an outlet 300 of the fifth heat exchanger 200 is plumbed to the pump 180. Accordingly, as the pump 180 is operated, the second heat exchange fluid is pulled from the reservoir 188 and into the inlet 296 of the fifth heat exchanger 200 in a siphon-like manner. Said another way, operation of the pump 180 may generate a positive pressure at the inlet 288 of the reservoir 188 and a negative pressure at the outlet 292 of the reservoir 188. Therefore, the pressure differential across the reservoir 188 can facilitate the introduction of the second heat exchange fluid into the inlet 296 of the fifth heat exchanger 200. In some examples, additional components can be included with the coolant loop 176 and plumbed between the outlet 300 of the fifth heat exchanger 200 and the pump 180. The second heat exchange fluid can provide heat to a cabin of a vehicle as a result of the fluid communication between the fifth heat exchanger 200 and a heat exchange fluid that is flowing through the ductwork 164 (e.g., ambient air). In various examples, the fifth heat exchanger 200 may operate as a heater core. Alternatively, heat from the second heat exchange fluid may be directed to components that can benefit from such heat, such as batteries, electrical components, the first heat-producing component 192, and/or the second heat-producing component 196 during cold weather conditions in the environment within which the vehicle or the heat pump 20 currently occupies at a given time (e.g., see FIG. 9).

Referring again to FIGS. 5-13 and 16, from the outlet 292 of the reservoir 188, the second heat exchange fluid is directed to a first port 304 of the first three-way valve 208. In each of these modes of operation, the first three-way valve 208 is positioned such that the second heat exchange fluid received at the first port 304 is directed to exit the first three-way valve 208 by way of a second port 308 thereof. From the second port 308 of the first three-way valve 208, the second heat exchange fluid is directed toward a first port 312 of the second three-way valve 212. In each of these modes of operation, the second three-way valve 212 is positioned such that the second heat exchange fluid received at the first port 312 is directed to exit the second three-way valve 212 by way of a second port 316 thereof. The second heat-producing component 196 is plumbed to the first and second three-way valves 208, 212 such that the second heat-producing component 196 is in series with the reservoir 188, the fifth heat exchanger 200, and/or the first heat-producing component 192. More specifically, an inlet 320 of the second heat-producing component 196 is plumbed to a third port 324 of the first three-way valve 208 and an outlet 328 of the second heat-producing component 196 is plumbed to a third port 332 of the second three-way valve 212.

Referring further to FIGS. 5-13 and 16, when the first three-way valve 208 is positioned to utilize the second heat-producing component 196 in a given mode of operation, the second heat exchange fluid received at the first port 304 is directed to exit the first three-way valve 208 by way of the third port 324 thereof. From the third port 324 of the first three-way valve 208, the second heat exchange fluid is directed to the inlet 320 of the second heat-producing component 196. The second heat-producing component 196 can be an engine, electronics, battery, battery pack, one or more heating elements, brakes, or the like. After interacting with the second heat-producing component 196, the second heat exchange fluid exits the second heat-producing component 196 by way of the outlet 328 thereof. As a result of interaction with the second heat-producing component 196, the second heat exchange fluid that exits by way of the outlet 328 may have a greater pressure and/or a greater temperature than the second heat exchange fluid that entered by way of the inlet 320. From the outlet 328 of the second heat-producing component 196, the second heat exchange fluid is directed to the third port 332 of the second three-way valve 212. Based upon a positioning of the second three-way valve 212 in such an example, the second heat exchange fluid received at the third port 332 is directed to exit the second three-way valve 212 by way of the second port 316 thereof. From the second port 316 of the second three-way valve 212, the second heat exchange fluid is directed to a first port 336 of the third three-way valve 216.

Referring again to FIGS. 5-8, 10-13, and 16, in each of these modes of operation, the third three-way valve 216 is positioned such that at least a portion of the second heat exchange fluid received at the first port 336 is directed to exit the third three-way valve 216 by way of a second port 340 thereof. The second heat exchange fluid that exits the third three-way valve 216 by way of the second port 340 thereof is directed to the inlet 296 of the fifth heat exchanger 200. While in the fifth heat exchanger 200, the heat carried by the second heat exchange fluid can be employed in the manner outlined above. The second heat exchange fluid exits the fifth heat exchanger 200 by way of the outlet 300. From the outlet 300, the second heat exchange fluid is directed toward a first port 344 of the fourth three-way valve 220. The second heat exchange fluid received at the first port 344 is directed to exit the fourth three-way valve 220 by way of a second port 348 thereof. From the second port 348 of the fourth three-way valve 220, the second heat exchange fluid is directed to the pump 180.

Figure 8:
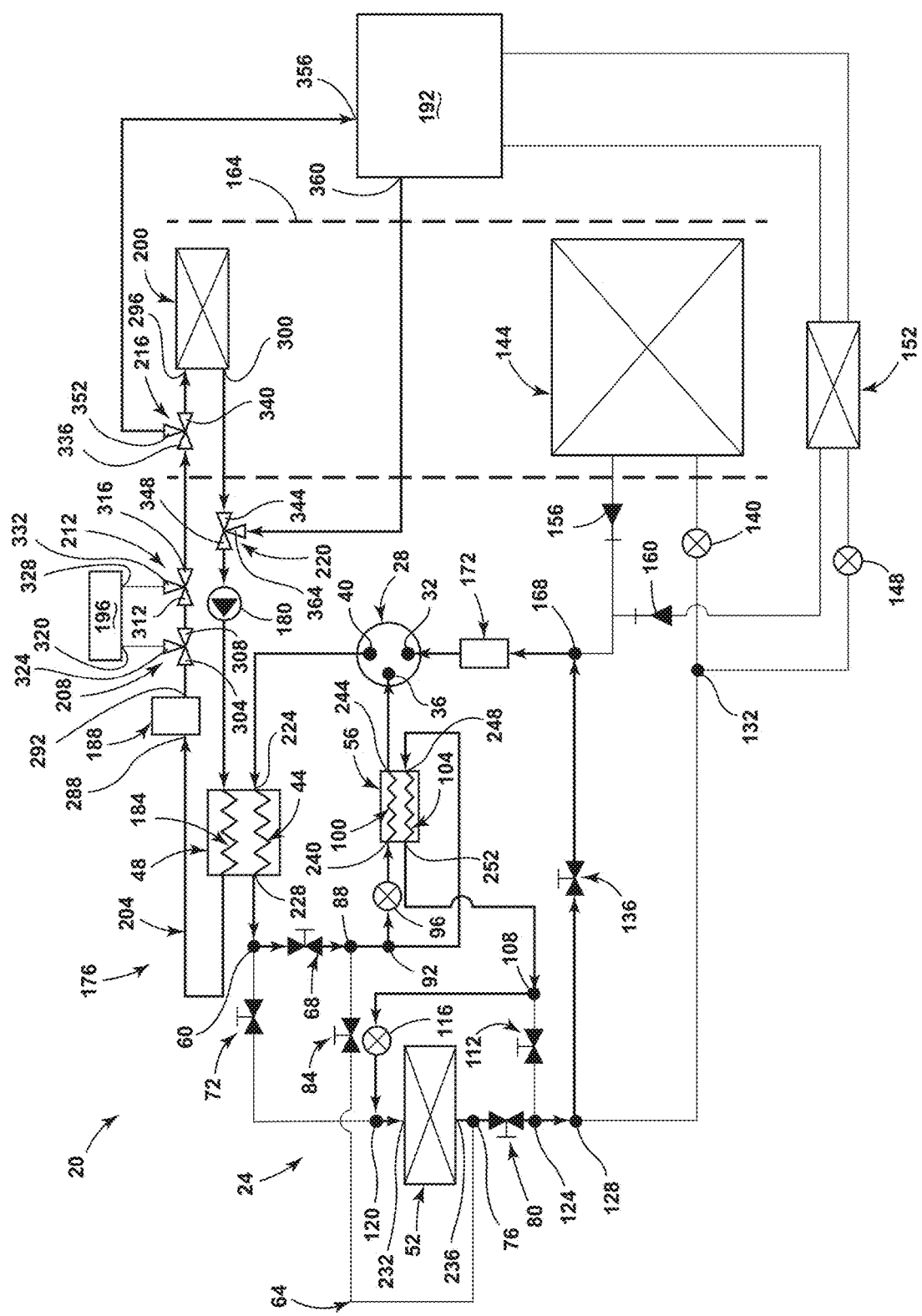
FIG. 8 is a schematic representation of the heat pump arrangement, illustrating a cabin heating and battery heating mode of operation, according to one example.
Figure 9:
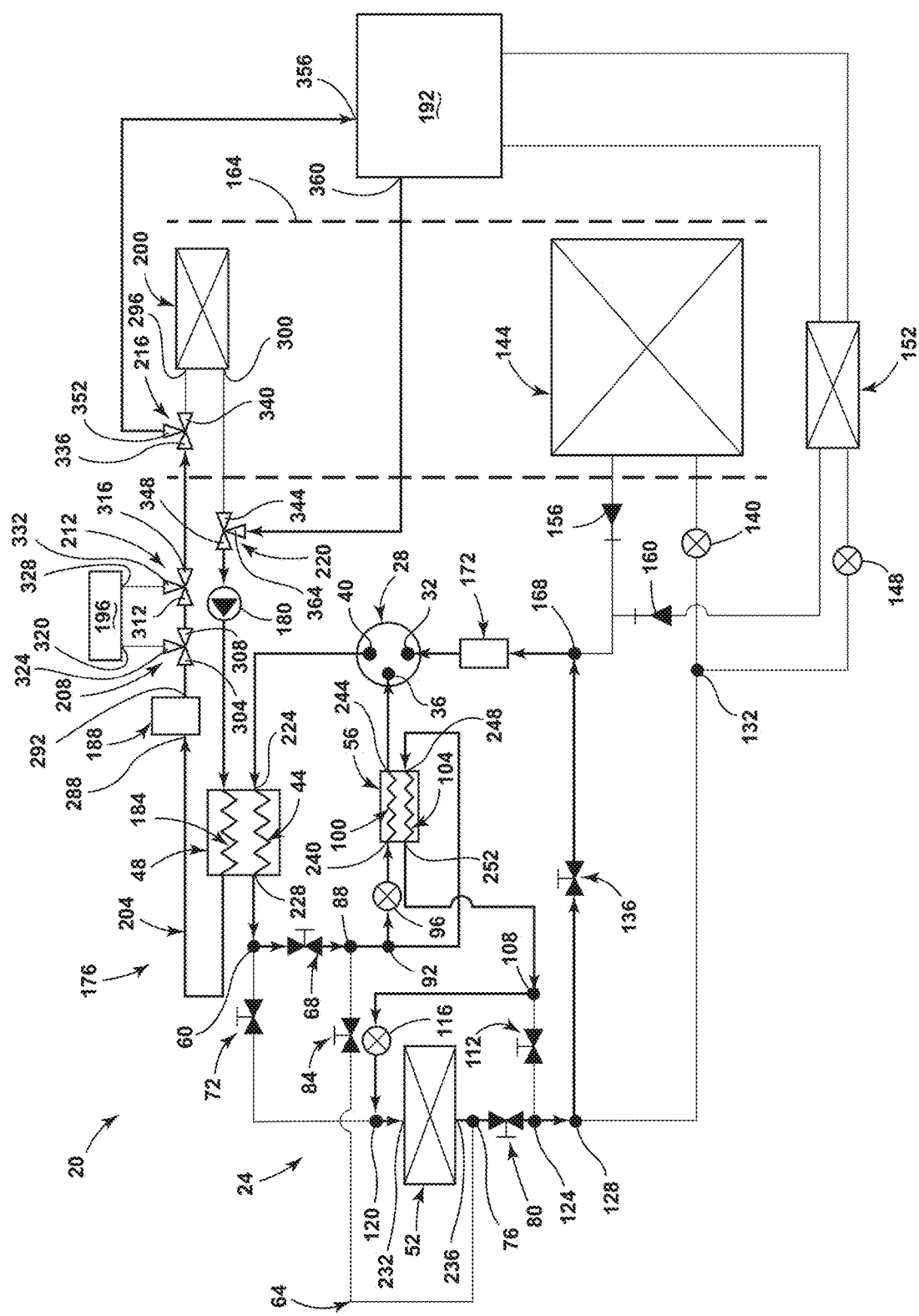
FIG. 9 is a schematic representation of the heat pump arrangement, illustrating a battery heating mode of operation, according to one example.

Referring particularly to FIGS. 8 and 9, when the first heat-producing component 192 is utilized in a given mode of operation, the positioning of the third three-way valve 216 is such that the second heat exchange fluid received at the first port 336 is directed to exit the third three-way valve 216 by way of the second port 340 and/or a third port 352 thereof. Accordingly, the second heat exchange fluid may be split into a first portion and a second portion at the third three-way valve 216, with the first portion being directed toward the fifth heat exchanger 200 and the second portion being directed toward the first heat-producing component 192 (e.g., see FIG. 8). The flow of the first portion of the second heat exchange fluid from the third three-way valve 216 through the fifth heat exchanger 200 has already been described. From the third port 352, the second portion of the second heat exchange fluid is directed to a second inlet 356 of the first heat-producing component 192. In the mode of operation depicted in FIG. 9, an entirety of the second heat exchange fluid that encounters the third three-way valve 216 is directed toward the second inlet 356 of the first heat-producing component 192. The second inlet 356 of the first heat-producing component 192 can be immediately downstream of the third port 352 of the third three-way valve 216.

Referring again to FIGS. 8 and 9, the second heat exchange fluid that is received at the second inlet 356 may provide heat to the first heat-producing component 192 (e.g., during cold weather). The second heat exchange fluid that is received at the second inlet 356 exits the first heat-producing component 192 by way of a second outlet 360 thereof. In some examples, the second heat exchange fluid may decrease in temperature, pressure, and/or vapor percentage as a result of interaction with the first heat-producing component 192. Upon exiting the second outlet 360 of the first heat-producing component 192, the second heat exchange fluid is directed to a third port 364 of the fourth three-way valve 220. In the mode of operation depicted in FIG. 8, the fourth three-way valve 220 is positioned such that the first portion of the second heat exchange fluid received at the first port 344 and the second portion of the second heat exchange fluid received at the third port 364 are recombined, or rejoined, and ultimately directed to exit the fourth three-way valve 220 by way of the second port 348 thereof. In the mode of operation depicted in FIG. 9, the fourth three-way valve 220 receives the second heat exchange fluid at the third port 364 and directs the second heat exchange fluid to exit by way of the second port 348 thereof. From the second port 348 of the fourth three-way valve 220, the second heat exchange fluid is directed toward the pump 180.

The present disclosure has discussed a variety of modes of operation for the heat pump 20. While a specific example of the heat pump 20 and specific examples of the modes of operation of the heat pump 20 have been discussed in detail, the present disclosure is not limited to the arrangement of the heat pump 20 discussed herein. Similarly, the present disclosure is not limited to the modes of operation discussed herein. Rather, the present disclosure provides exemplary discussion of the operation of the various components of the heat pump 20 that may inform additional modes of operation and/or arrangements that are not explicitly articulated herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A heat pump, comprising:
   a refrigerant loop comprising:
   a compressor having a low-pressure inlet, a mid-pressure inlet, and an outlet;
   a first region of a first heat exchanger, wherein the first heat exchanger is positioned immediately downstream of the outlet of the compressor;
   a second heat exchanger downstream of the first heat exchanger;
   a vapor generator positioned downstream of the first heat exchanger, wherein the vapor generator is positioned upstream of the second heat exchanger in a first mode of operation, wherein the vapor generator is positioned downstream of the second heat exchanger in a second mode of operation, wherein the vapor generator is positioned upstream of both the low-pressure inlet and the mid-pressure inlet, and wherein the vapor generator delivers at least a portion of a gaseous component of a first heat exchange fluid to the mid-pressure inlet of the compressor; and
a first branching point positioned immediately downstream of the first region of the first heat exchanger;
a first shutoff valve positioned immediately downstream of the first branching point;
a second shutoff valve positioned immediately downstream of the first branching point, wherein the second heat exchanger is positioned downstream of the second shutoff valve;
a second branching point positioned downstream of the second heat exchanger;
a third shutoff valve and a fourth shutoff valve each positioned downstream of the second branching point, respectively;
a first coupling point positioned downstream of the fourth shutoff valve; and
a third branching point positioned immediately downstream of the first coupling point.

2. The heat pump of claim 1, wherein the refrigerant loop further comprises:
a first expansion valve positioned downstream of the third branching point.

3. The heat pump of claim 2, wherein the vapor generator comprises a first region and a second region, wherein the first region of the vapor generator is positioned immediately downstream of the first expansion valve, and wherein the second region of the vapor generator is positioned immediately downstream of the third branching point.

4. The heat pump of claim 3, wherein the mid-pressure inlet of the compressor is immediately downstream of the first region of the vapor generator.

5. The heat pump of claim 3, wherein the refrigerant loop further comprises:
a fourth branching point positioned downstream of the second region of the vapor generator.

6. The heat pump of claim 5, wherein the refrigerant loop further comprises:
a fifth shutoff valve positioned immediately downstream of the fourth branching point.

7. The heat pump of claim 6, wherein the refrigerant loop further comprises:
a second expansion valve positioned immediately downstream of the fourth branching point.

8. The heat pump of claim 7, wherein the refrigerant loop further comprises:
a second coupling point positioned immediately downstream of the second expansion valve, wherein the second coupling point is positioned immediately upstream of the second heat exchanger.

9. The heat pump of claim 8, wherein the refrigerant loop further comprises:
a third expansion valve positioned downstream of the fifth shutoff valve;
a third heat exchanger positioned immediately downstream of the third expansion valve;
a fourth expansion valve positioned downstream of the fifth shutoff valve;
a fourth heat exchanger positioned immediately downstream of the fourth expansion valve; and
an accumulator positioned immediately upstream of the low-pressure inlet of the compressor.

10. The heat pump of claim 9, further comprising:
a coolant loop comprising:
a pump;
a second region of the first heat exchanger;
a reservoir;
a fifth heat exchanger;
a first heat-producing component;
a second heat-producing component; and
a coolant network of conduits that fluidly couples components of the coolant loop.

11. A heat pump, comprising:
a refrigerant loop comprising:
a compressor having a low-pressure inlet, a mid-pressure inlet, and an outlet;
a first region of a first heat exchanger, wherein the first heat exchanger is positioned immediately downstream of the outlet of the compressor;
a second heat exchanger downstream of the first heat exchanger;
a vapor generator positioned downstream of the first heat exchanger, wherein the vapor generator is positioned upstream of the second heat exchanger in a first mode of operation, wherein the vapor generator is positioned downstream of the second heat exchanger in a second mode of operation, wherein the vapor generator is positioned upstream of both the low-pressure inlet and the mid-pressure inlet, and wherein the vapor generator delivers at least a portion of a gaseous component of a first heat exchange fluid to the mid-pressure inlet of the compressor;
a first branching point positioned immediately downstream of the first region of the first heat exchanger;
a first shutoff valve positioned immediately downstream of the first branching point;
a second shutoff valve positioned immediately downstream of the first branching point, wherein the second heat exchanger is positioned downstream of the second shutoff valve;
a second branching point positioned downstream of the second heat exchanger;
a third shutoff valve positioned downstream of the second branching point;
a fourth shutoff valve positioned downstream of the second branching point;
a first coupling point positioned downstream of the fourth shutoff valve;
a third branching point positioned immediately downstream of the first coupling point; and
a first expansion valve positioned downstream of the third branching point, wherein the vapor generator comprises a first region and a second region, wherein the first region of the vapor generator is positioned immediately downstream of the first expansion valve, wherein the second region of the vapor generator is positioned immediately downstream of the third branching point, and wherein the mid-pressure inlet of the compressor is immediately downstream of the first region of the vapor generator.

12. The heat pump of claim 11, wherein the refrigerant loop further comprises:
a fourth branching point positioned downstream of the second region of the vapor generator;
a fifth shutoff valve positioned immediately downstream of the fourth branching point;
a second expansion valve positioned immediately downstream of the fourth branching point; and
a second coupling point positioned immediately downstream of the second expansion valve, wherein the second coupling point is positioned immediately upstream of the second heat exchanger.

13. The heat pump of claim 12, wherein the refrigerant loop further comprises:
   a third expansion valve positioned downstream of the fifth shutoff valve;
   a third heat exchanger positioned immediately downstream of the third expansion valve;
   a fourth expansion valve positioned downstream of the fifth shutoff valve;
   a fourth heat exchanger positioned immediately downstream of the fourth expansion valve; and
   an accumulator positioned immediately upstream of the low-pressure inlet of the compressor.

14. A heat pump, comprising:
   a refrigerant loop comprising:
      a compressor having a low-pressure inlet, a mid-pressure inlet, and an outlet;
      a first region of a first heat exchanger, wherein the first heat exchanger is positioned immediately downstream of the outlet of the compressor;
      a second heat exchanger downstream of the first heat exchanger;
      a vapor generator positioned downstream of the first heat exchanger, wherein the vapor generator is positioned upstream of the second heat exchanger in a first mode of operation, wherein the vapor generator is positioned downstream of the second heat exchanger in a second mode of operation, wherein the vapor generator is positioned upstream of both the low-pressure inlet and the mid-pressure inlet, and wherein the vapor generator delivers at least a portion of a gaseous component of a first heat exchange fluid to the mid-pressure inlet of the compressor;
      a first branching point positioned immediately downstream of the first region of the first heat exchanger;
      a first shutoff valve and a second shutoff valve each positioned downstream of a second branching point, respectively;
      a first coupling point positioned downstream of the second shutoff valve; and
      the second branching point positioned immediately downstream of the first coupling point.

15. The heat pump of claim 14, further comprising:
   a coolant loop comprising:
      a pump;
      a second region of the first heat exchanger;
      a reservoir;
      a fifth heat exchanger;
      a first heat-producing component;
      a second heat-producing component; and
      a coolant network of conduits that fluidly couples components of the coolant loop.

16. The heat pump of claim 14, wherein the mid-pressure of the compressor is immediately downstream of the first region of the vapor generator.

17. The heat pump of claim 14, wherein the vapor generator comprises a first region and a second region, wherein the first region of the vapor generator is positioned immediately downstream of a first expansion valve, and wherein the second region of the vapor generator is positioned immediately downstream of a third branching point.

* * * * *